(12) United States Patent
Kim et al.

(10) Patent No.: US 10,802,355 B2
(45) Date of Patent: Oct. 13, 2020

(54) LIQUID CRYSTAL DISPLAY DEVICE

(71) Applicant: LG Display Co., Ltd., Seoul (KR)

(72) Inventors: Won-Taeck Kim, Paju-si (KR); You-Hyun Eom, Paju-si (KR); So-Hyeong Ahn, Paju-si (KR); Song-Yi Jeong, Paju-si (KR)

(73) Assignee: LG DISPLAY CO., LTD., Seoul (KR)

( * ) Notice: Subject to any disclaimer, the term of this patent is extended or adjusted under 35 U.S.C. 154(b) by 0 days.

(21) Appl. No.: 16/201,751

(22) Filed: Nov. 27, 2018

(65) Prior Publication Data

US 2019/0171072 A1 Jun. 6, 2019

(30) Foreign Application Priority Data

Dec. 4, 2017 (KR) .................. 10-2017-0165218
Aug. 17, 2018 (KR) .................. 10-2018-0096209
Aug. 24, 2018 (KR) .................. 10-2018-0099307

(51) Int. Cl.
*G02F 1/1343* (2006.01)
*G02F 1/1362* (2006.01)
(Continued)

(52) U.S. Cl.
CPC ...... *G02F 1/134363* (2013.01); *G02F 1/1347* (2013.01); *G02F 1/1368* (2013.01);
(Continued)

(58) Field of Classification Search
CPC ............. G02F 1/1333; G02F 1/133345; G02F 1/133377; G02F 1/133707; G02F 1/1362; G02F 1/136227; G02F 1/133512; G02F 1/133528; G02F 1/1343; G02F 1/134309; G02F 1/134336; G02F 1/134363; G02F 1/1347; G02F 1/136286; G02F 1/1368; G02F 1/137; G02F 2001/134372; G02F 2001/134318; G02F 2001/13706; G02F 2001/13712; G02F 2001/133531; G02F 2201/121; G02F 2201/122; G02F 2201/123; G02F 1/1337; G02F 1/133711; G02F 2001/133357; H01L 27/3276;
(Continued)

(56) References Cited

U.S. PATENT DOCUMENTS 8,300,193 B2 * 10/2012 Lee .................. G02F 1/133707
349/138
2004/0209388 A1 * 10/2004 Cheng ................ G02F 1/13378
438/30

(Continued)

FOREIGN PATENT DOCUMENTS

JP 2002-268065 * 9/2002 ........... G02F 1/1343

*Primary Examiner* — Thoi V Duong
(74) *Attorney, Agent, or Firm* — Seed IP Law Group LLP

(57) ABSTRACT

A liquid crystal display device includes: first and second substrates facing and spaced apart from each other, the first and second substrates having a pixel region; a gate line and a data line on an inner surface of the first substrate, the gate line and the data line crossing each other adjacent to the pixel region; a thin film transistor connected to the gate line and the data line in the pixel region; a first electrode of a plate shape over the thin film transistor; a second electrode of a bar shape over the first electrode; and a liquid crystal layer between the first and second substrates.

16 Claims, 13 Drawing Sheets

(51) Int. Cl.
*G02F 1/1368* (2006.01)
*G02F 1/1333* (2006.01)
*G02F 1/1347* (2006.01)
*G02F 1/1335* (2006.01)
*G02F 1/1337* (2006.01)
*G02F 1/137* (2006.01)

(52) U.S. Cl.
CPC .. *G02F 1/133345* (2013.01); *G02F 1/133377* (2013.01); *G02F 1/133512* (2013.01); *G02F 1/133528* (2013.01); *G02F 1/133707* (2013.01); *G02F 1/134309* (2013.01); *G02F 1/136227* (2013.01); *G02F 1/137* (2013.01); G02F 1/136286 (2013.01); G02F 2001/13706 (2013.01); G02F 2001/13712 (2013.01); G02F 2001/133531 (2013.01); G02F 2001/134372 (2013.01); G02F 2201/121 (2013.01); G02F 2201/122 (2013.01); G02F 2201/123 (2013.01)

(58) Field of Classification Search
CPC ............... G09G 3/3648; G09G 3/3225; G09G 2300/0426; G09G 2300/0439
See application file for complete search history.

(56) References Cited

U.S. PATENT DOCUMENTS

2015/0103300 A1* 4/2015 Kim ................... C09K 19/586
　　　　　　　　　　　　　　　　　　　　　　　349/123
2017/0131600 A1　5/2017 Matsushima

* cited by examiner

| | | CR | WL |
|---|---|---|---|
| 1st embodiment | 0.0 μm | 100.0% | 100.0% |
| 3rd embodiment | 0.4 μm | 108.0% | 99.4% |
| | 0.8 μm | 119.7% | 98.9% |
| | 1.2 μm | 127.7% | 98.1% |
| | 1.5 μm | 134.9% | 97.0% |
| | 2.0 μm | 145.6% | 94.4% |
| | 2.3 μm | 149.3% | 92.5% |
| | 2.5 μm | 152.2% | 89.5% |

LIQUID CRYSTAL DISPLAY DEVICE

CROSS-REFERENCE TO RELATED APPLICATION(S)

This application claims the benefit of priority of Korean Patent Application No. 10-2017-0165218, filed in the Republic of Korea on Dec. 4, 2017, No. 10-2018-0096209, filed in the Republic of Korea on Aug. 17, 2018 and No. 10-2018-0099307, filed in the Republic of Korea on Aug. 24, 2018, which are hereby incorporated by reference in its entirety for all purposes as if fully set forth herein.

BACKGROUND

Technical Field

The present disclosure relates to a liquid crystal display device, and more particularly, to a liquid crystal display device where a response speed, a transmittance and a white luminance are improved by forming a dielectric pattern on an electrode having a plurality of openings, by forming a black matrix corresponding to an electrode and a plurality of openings or by forming first and second liquid crystal capsule layers on outer surfaces of first and second substrates, respectively.

Description of the Related Art

In general, a liquid crystal display (LCD) device is driven by using an optical anisotropy and a polarization property of a liquid crystal. Since a liquid crystal molecule has a long and thin structure, an arrangement of the liquid crystal molecule has directionality. As a result, the arrangement direction of the liquid crystal molecule may be adjusted by applying an electric field to the liquid crystal molecule.

When the arrangement direction of the liquid crystal molecule is adjusted, the arrangement of the liquid crystal molecule is changed and a light is refracted along the arrangement direction of the liquid crystal molecule due to the optical anisotropy to display an image.

Recently, an active matrix liquid crystal display (AM-LCD) device where a thin film transistor (TFT) and a pixel electrode connected to the TFT are disposed in a matrix has been the subject of research and development due to having superior resolution and excellent display quality for a moving image.

The LCD device includes a color filter substrate having a common electrode, an array substrate having a pixel electrode and a liquid crystal layer between the color filter substrate and the array substrate. In the LCD device including the color filter substrate and the array substrate, the liquid crystal layer is driven by a vertical electric field between the common electrode and the pixel electrode. The LCD device including the color filter substrate and the array substrate has excellent properties in transmittance and aperture ratio.

An in-plane switching (IPS) mode LCD device, where a common electrode and a pixel electrode are alternately disposed on one of two substrates and a liquid crystal layer is disposed between two substrates, has been developed.

The IPS mode LCD device may adjust a light transmittance of the liquid crystal layer having a dielectric anisotropy (AO) by using a horizontal electric field to display an image.

In addition, a fringe field switching (FFS) mode LCD device having a viewing angle property superior to the IPS mode LCD device has been suggested.

FIG. 1 is a plan view showing a fringe field switching mode liquid crystal display device of the related art.

In FIG. 1, a fringe field switching (FFS) mode liquid crystal display (LCD) device 10 of the related art includes a gate line 43 of a straight line shape along a direction and a data line 51 of a straight line shape. The gate line 43 and the data line 51 crossing each other are disposed adjacent to a pixel region P.

A thin film transistor (TFT) Tr connected to the gate line 43 and the data line 51 is disposed in the pixel region P. The TFT Tr includes a gate electrode (not shown), a gate insulating layer (not shown), a semiconductor layer (not shown), a source electrode 55 and a drain electrode 58.

A common electrode 60 of a plate shape and a pixel electrode 70 overlapping the common electrode 60 are disposed in the pixel region P. The pixel electrode 70 has a plurality of openings op each having a bar shape. Although the common electrode 60 is formed in a whole display region, the common electrode 60 is shown by a dotted line corresponding to one pixel region P.

In the FFS mode LCD device 10, a fringe field is generated by applying a voltage to the pixel electrode 70 having the opening of a shape of a plurality of bar in each pixel region P and the common electrode 60, and accordingly a liquid crystal layer is driven by the fringe field.

To increase a reality of a display, a high speed response of an LCD device has been researched. A response time inversely proportional to a response speed may be represented by a time from a bright gray to a dark gray (gray to gray: GTG). For example, the GTG may be measured as a transition time from a luminance of 10% to a luminance of 90%.

In virtual reality (VR) equipment, due to an electro-optic effect of a liquid crystal of a fluid, the response speed is limited by the motion of the liquid crystal to cause an afterimage such as flickering of an image. In addition, although a viewing angle property is improved in the FFS mode LCD device of the related art, the FFS mode LCD device of the related art has limitations in increasing the response speed.

BRIEF SUMMARY

Accordingly, embodiments of the present disclosure are directed to a liquid crystal display device that substantially obviates one or more of the problems due to limitations and disadvantages of the related art.

Aspects of the present disclosure relate to a liquid crystal display device where a response speed, a transmittance and a white luminance are improved.

Additional features and aspects will be set forth in the description that follows, and in part will be apparent from the description, or may be learned by practice of the inventive concepts provided herein. Other features and aspects of the inventive concepts may be realized and attained by the structure particularly pointed out in the written description, or derivable therefrom, and the claims hereof as well as the appended drawings.

To achieve these and other aspects of the inventive concepts, as embodied and broadly described, a liquid crystal display device includes: first and second substrates facing and spaced apart from each other, the first and second substrates having a pixel region; a gate line and a data line on an inner surface of the first substrate, the gate line and the data line crossing each other disposed adjacent to the pixel region; a thin film transistor connected to the gate line and the data line in the pixel region; a first electrode of a plate shape over the thin film transistor; a second electrode of a bar shape over the first electrode; and a liquid crystal layer between the first and second substrates, wherein the second electrode includes: a plurality of first bars spaced apart from each other and extending along a first direction parallel to the gate line; a first connecting part connecting the plurality of first bars and extending along a second direction parallel to the data line; a plurality of second bars symmetric to the plurality of first bars with respect to a central line of the pixel region, the plurality of second bars spaced apart from each other and extending along the first direction; and a second connecting part connecting the plurality of second bars and extending along the second direction.

It is to be understood that both the foregoing general description and the following detailed description are explanatory, and are intended to provide further explanation of the aspects as claimed.

BRIEF DESCRIPTION OF THE SEVERAL VIEWS OF THE DRAWINGS

The accompanying drawings, which are included to provide a further understanding of the disclosure, are incorporated in and constitute a part of this application, illustrate embodiments of the disclosure and together with the description serve to explain the principles of the disclosure. In the drawings.

DETAILED DESCRIPTION

Figure 1:
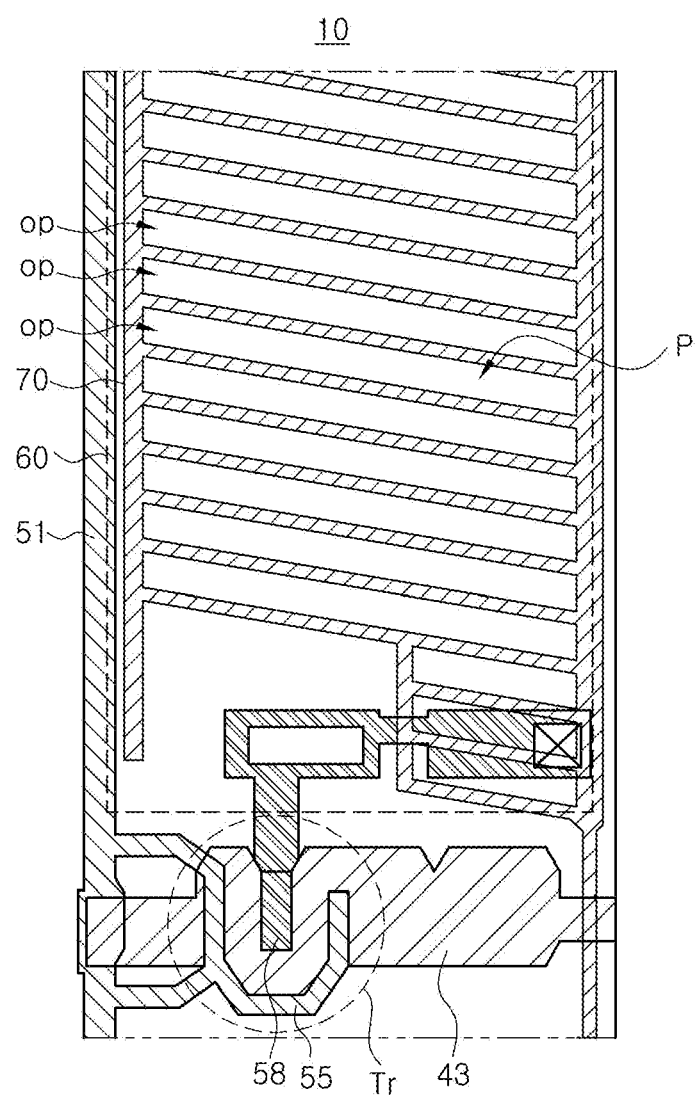
FIG. 1 is a plan view showing a fringe field switching mode liquid crystal display device of the related art.

Reference will now be made in detail to aspects of the present disclosure, examples of which are illustrated in the accompanying drawings. In the following description, when a detailed description of well-known functions or configurations related to this document is determined to unnecessarily cloud a gist of an aspect of the disclosure, the detailed description thereof will be omitted. The progression of processing steps and/or operations described is an example; however, the sequence of steps and/or operations is not limited to that set forth herein and may be changed as is known in the art, with the exception of steps and/or operations necessarily occurring in a certain order. Like reference numerals designate like elements throughout. Names of the respective elements used in the following explanations are selected only for convenience of writing the specification and may be thus different from those used in actual products.

Figure 2:
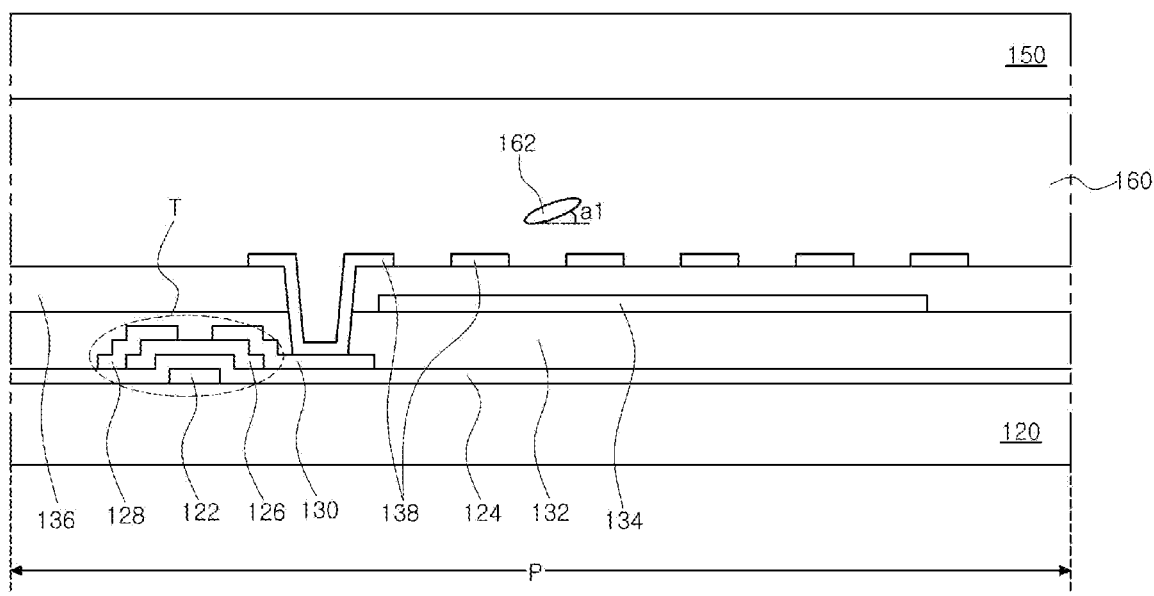
FIG. 2 is a cross-sectional view showing a liquid crystal display device according to a first embodiment of the present disclosure.
Figure 3:
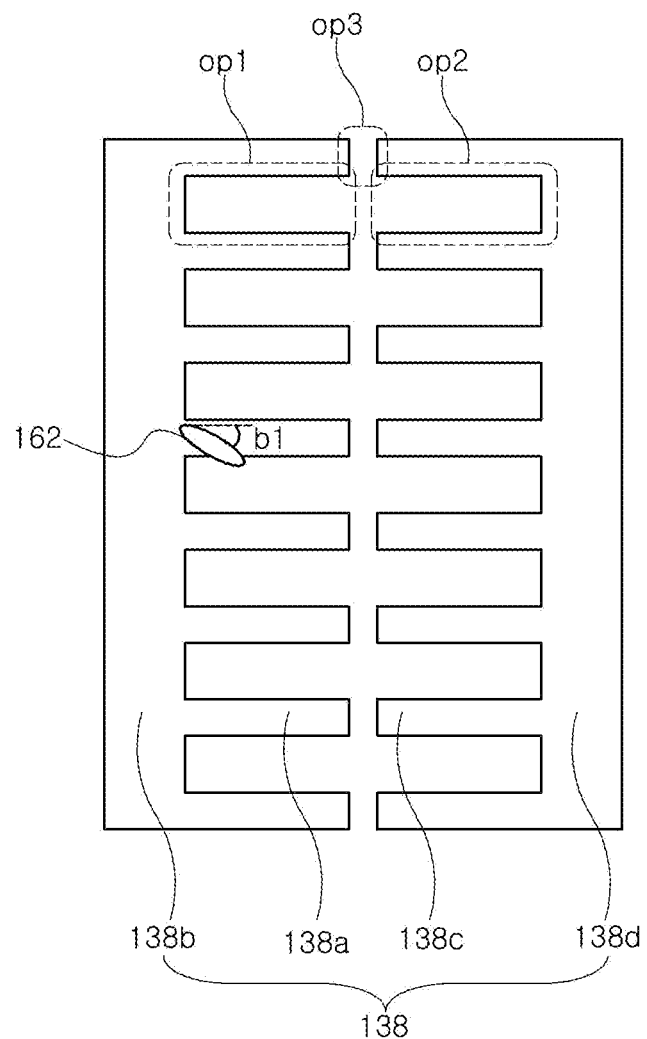
FIG. 3 is a plan view showing a second electrode of a liquid crystal display device according to a first embodiment of the present disclosure.

FIG. 2 is a cross-sectional view showing a liquid crystal display device according to a first embodiment of the present disclosure, and FIG. 3 is a plan view showing a second electrode of a liquid crystal display device according to a first embodiment of the present disclosure.

In FIGS. 2 and 3, a liquid crystal display (LCD) device 110 according to a first embodiment of the present disclosure includes first and second substrates 120 and 150 facing and spaced apart from each other and a liquid crystal layer 160 between the first and second substrates 120 and 150. The first and second substrates 120 and 150 include a plurality of pixel regions P.

A thin film transistor (TFT) T and first and second electrodes 134 and 138 are disposed in each of the plurality of pixel regions P on an inner surface of the first substrate 120. A gate electrode 122 is disposed in each of the plurality of pixel regions P on the inner surface of the first substrate 120, and a gate insulating layer 124 is disposed on the gate electrode 122 in a whole of the first substrate 120.

A semiconductor layer 126 is disposed on the gate insulating layer 124 corresponding to the gate electrode 122, and a source electrode 128 and a drain electrode 130 spaced apart from each other are disposed on both end portions of the semiconductor layer 126.

The gate electrode 122, the semiconductor layer 126, the source electrode 128 and the drain electrode 130 constitute the TFT T.

Although not shown, a gate line and a data line are disposed over the first substrate 120 and the TFT T is connected to the gate line and the data line. The gate line and the data line crossing each other to form the pixel region P adjacent to the crossing location.

A first insulating layer 132 is disposed on the TFT T in a whole of the first substrate 120, and a first electrode 134 of a plate shape is disposed on the first insulating layer 132 in each pixel region P.

A second insulating layer 136 is disposed on the first electrode 134 in a whole of the first substrate 120, and a second electrode 138 of a bar shape is disposed on the second insulating layer 136 corresponding to the first electrode 134.

The second electrode 138 is connected to the drain electrode 130 of the TFT T through a drain contact hole of the first and second insulating layers 132 and 136. The second electrode 138 may include a plurality of first bars 138a, a first connecting part 138b, a plurality of second bars 138c and a second connecting part 138d. The plurality of first bars 138a are extended along a first direction parallel to the gate line. The first connecting part 138b connects the plurality of first bars 138a and is extended along a second direction parallel to the data line. The plurality of second bars 138c are symmetric to the plurality of first bars 138a with respect to a central line of the pixel region P and are extended along the first direction. The second connecting part 138d connects the plurality of second bars 138c and is extended along the second direction.

The second electrode 138 has a first opening op1 between the plurality of first bars 138a, a second opening op2 between the plurality of second bars 138c and a third opening op3 between the plurality of first bars 138a and the plurality of second bars 138c.

For example, a length of a side along the second direction of the first and second openings op1 and op2, which is a gap distance between adjacent two of the plurality of first bars 138a and is a gap distance between adjacent two of the plurality of second bars 138c, may be about 1 µm to about 5 µm.

A length of a side along the first direction of the third opening op3, which is a gap distance between the plurality of first bars 138a and the plurality of second bars 138c, may be about 3% to about 15% of a length of a side along the first direction of the pixel region P and may be about 5% to about 20% of a length of a side along the first direction of the second electrode 138. For example, the length of a side along the first direction of the third opening op3 may be about 1 µm to about 5 µm.

Although the first electrode 134 is a common electrode and the second electrode 138 is a pixel electrode connected to the TFT T in the first embodiment, the first electrode 134 may be a pixel electrode connected to the TFT T and the second electrode 138 may be a common electrode in another embodiment.

The liquid crystal layer 160 includes a plurality of liquid crystal molecules 162. The liquid crystal molecule 162 on an edge portion of the plurality of first bars 138a and the plurality of second bars 138c of the second electrode 138 may have a first tilt angle a1 with respect to the first substrate 120 and have a first twist angle b1 with respect to the first direction after an electric field is generated.

The liquid crystal layer 160 may be initially aligned along the first direction and the plurality of liquid crystal molecules 162 may have a positive dielectric anisotropy ($\Delta\varepsilon > 0$). Alternatively, the liquid crystal layer 160 may be initially aligned along the second direction and the plurality of liquid crystal molecules 162 may have a negative dielectric anisotropy ($\Delta\varepsilon < 0$).

In the LCD device 110, a voltage is applied to the first and second electrodes 134 and 138 to generate an electric field. An electric field along the second direction may be generated at a side extending along the first direction of the plurality of first bars 138a and the plurality of second bars 138c, and an electric field along the first direction may be generated at a side extending along the second direction of the plurality of first bars 138a and the plurality of second bars 138c and a side extending along the second direction of the first and second connecting parts 138b and 138d. An electric field along a diagonal direction between the first and second directions may be generated at a corner portion of the first, second and third openings op1, op2 and op3.

The liquid crystal molecule 162 at the corner portion of the first, second and third openings op1, op2 and op3, which is disposed along the first direction before the voltage is applied, rotates in preference to a clockwise direction or a counterclockwise direction by the electric field along the diagonal direction to be promptly realigned after the voltage is applied.

The liquid crystal molecule 162 at the side extending along the first direction of the plurality of first bars 138a and the plurality of second bars 138c, which is extended along the first direction before the voltage is applied, rotates without preference to a clockwise direction or a counterclockwise direction by the electric field along the second direction to be realigned after the voltage is applied. The liquid crystal molecule 162 at the side extending along the first direction of the plurality of first bars 138a and the plurality of second bars 138c is promptly realigned due to the realigned liquid crystal molecule 162 at the corner portion of the first, second and third openings op1, op2 and op3.

Accordingly, in the LCD device 110 according to the first embodiment, the liquid crystal layer 160 is driven by the electric field generated between the first and second electrodes 134 and 138. The liquid crystal molecule 162 at the corner portion of the first, second and third openings op1, op2 and op3 is promptly realigned in preference to a rotational direction, and the liquid crystal molecule 162 at the side extending along the first direction of the plurality of first bars 138a and the plurality of second bars 138c is promptly realigned due to the realignment of the liquid crystal molecule 162 at the corner portion of the first, second and third openings op1, op2 and op3. As a result, a response time defined as a sum of a rising time and a falling time of the liquid crystal molecule 162 is reduced and a response speed increases. Therefore, the LCD device 110 may be easily applied to virtual reality (VR) equipment.

For example, the rising time, the falling time and the response time of the liquid crystal molecule 162 may be about 7.7 msec, about 2.6 msec and about 10.3 msec, respectively.

In the LCD device 110, a disclination corresponding to a central portion of the plurality of first bars 138a and the plurality of second bars 138c of the second electrode 138 and a central portion of the first, second and third openings op1, op2 and op3 may be generated. As a result, transmittance, brightness and contrast ratio of the LCD device 110 may be reduced.

To improve reduction of the transmittance and the brightness, a dielectric pattern may be formed on the second electrode 138 in another embodiment.

Figure 4:
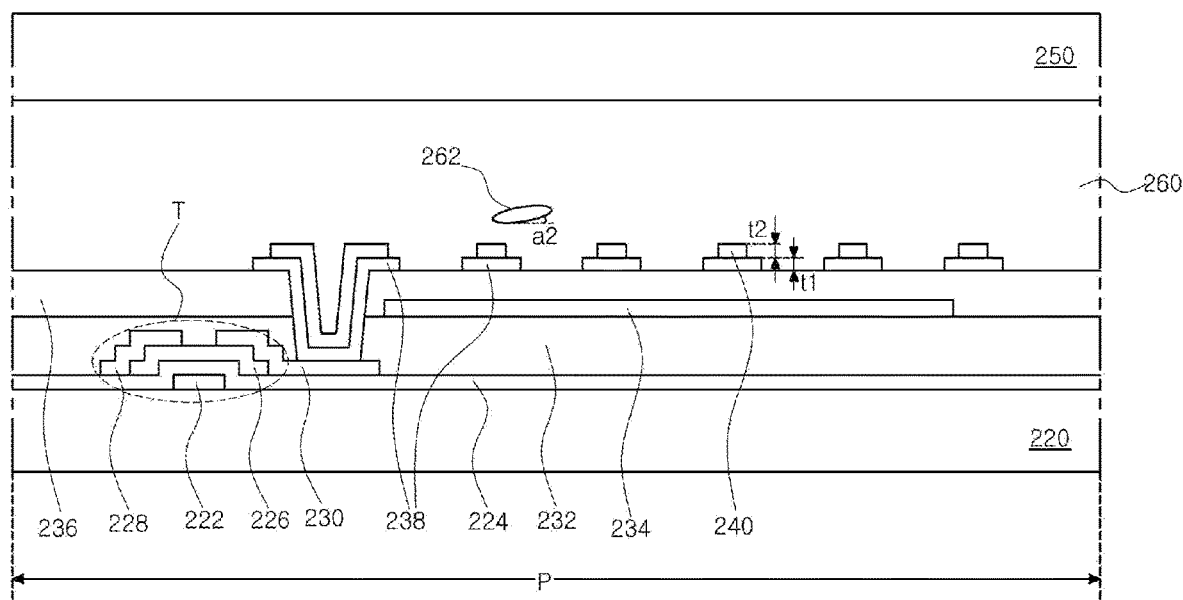
FIG. 4 is a cross-sectional view showing a liquid crystal display device according to a second embodiment of the present disclosure.
Figure 5:
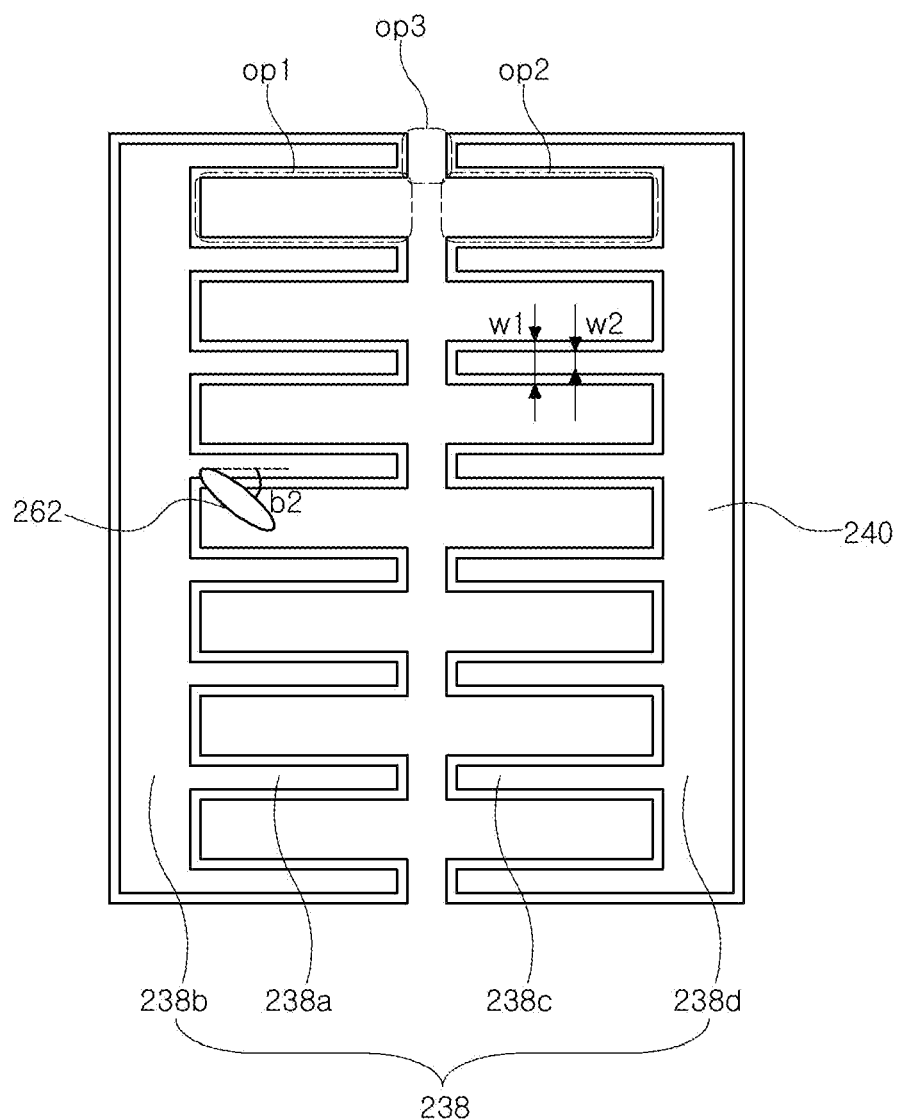
FIG. 5 is a plan view showing a second electrode and a dielectric pattern of a liquid crystal display device according to a second embodiment of the present disclosure.

FIG. 4 is a cross-sectional view showing a liquid crystal display device according to a second embodiment of the present disclosure, and FIG. 5 is a plan view showing a second electrode and a dielectric pattern of a liquid crystal display device according to a second embodiment of the present disclosure. Illustration of parts the same as the first embodiment may be omitted.

In FIGS. 4 and 5, a liquid crystal display (LCD) device 210 according to a second embodiment of the present disclosure includes first and second substrates 220 and 250 facing and spaced apart from each other and a liquid crystal layer 260 between the first and second substrates 220 and 250. The first and second substrates 220 and 250 include a plurality of pixel regions P.

A thin film transistor (TFT) T and first and second electrodes 234 and 238 are disposed in each of the plurality of pixel regions P on an inner surface of the first substrate 220. A gate electrode 222 is disposed in each of the plurality of pixel regions P on the inner surface of the first substrate 220, and a gate insulating layer 224 is disposed on the gate electrode 222 in a whole of the first substrate 220.

A semiconductor layer 226 is disposed on the gate insulating layer 224 corresponding to the gate electrode 222, and a source electrode 228 and a drain electrode 230 spaced apart from each other are disposed on both end portions of the semiconductor layer 226.

The gate electrode 222, the semiconductor layer 226, the source electrode 228 and the drain electrode 230 constitute the TFT T.

Although not shown, a gate line and a data line are disposed over the first substrate 220 and the TFT T is connected to the gate line and the data line. The gate line and the data line cross each other adjacent to the pixel region P.

A first insulating layer 232 is disposed on the TFT T in a whole of the first substrate 220, and a first electrode 234 of a plate shape is disposed on the first insulating layer 232 in each pixel region P.

A second insulating layer 236 is disposed on the first electrode 234 in a whole of the first substrate 220, and a second electrode 238 of a bar shape is disposed on the second insulating layer 236 corresponding to the first electrode 234.

The second electrode 238 is connected to the drain electrode 230 of the TFT T through a drain contact hole of the first and second insulating layers 232 and 236. The second electrode 238 may include a plurality of first bars 238a, a first connecting part 238b, a plurality of second bars 238c and a second connecting part 238d. The plurality of first bars 238a are extended along a first direction parallel to the gate line. The first connecting part 238b connects the plurality of first bars 238a and is extended along a second direction parallel to the data line. The plurality of second bars 238c are symmetric to the plurality of first bars 238a with respect to a central line of the pixel region P and are extended along the first direction. The second connecting part 238d connects the plurality of second bars 238c and is extended along the second direction.

The second electrode 238 has a first opening op1 between the plurality of first bars 238a, a second opening op2 between the plurality of second bars 238c and a third opening op3 between the plurality of first bars 238a and the plurality of second bars 238c.

For example, a length of a side extending along the second direction of the first and second openings op1 and op2, which is a gap distance between adjacent two of the plurality of first bars 238a and is a gap distance between adjacent two of the plurality of second bars 238c, may be about 1 µm to about 5 µm.

A length of a side along the first direction of the third opening op3, which is a gap distance between the plurality of first bars 238a and the plurality of second bars 238c, may be about 3% to about 15% of a length of a side along the first direction of the pixel region P and may be about 5% to about 20% of a length of a side along the first direction of the second electrode 238. For example, the length of a side along the first direction of the third opening op3 may be about 1 µm to about 5 µm.

Although the first electrode 234 is a common electrode and the second electrode 238 is a pixel electrode connected to the TFT T in the second embodiment, the first electrode 234 may be a pixel electrode connected to the TFT T and the second electrode 238 may be a common electrode in another embodiment.

A dielectric pattern 240 having the same shape as the second electrode 238 is disposed on the second electrode 238. For example, the dielectric pattern 240 may include an inorganic insulating material such as silicon oxide ($SiO_2$) and silicon nitride (SiNx) or an organic insulating material such as photoacryl and benzocyclobutene (BCB).

The second electrode 238 and the dielectric pattern 240 have first and second thicknesses t1 and t2, respectively. For example, the first and second thicknesses t1 and t2 may be the same as each other.

The dielectric pattern 240 on each of the plurality of first bars 238a and the plurality of second bars 238c may have a second width w2 substantially the same as a width of a disclination on each of the plurality of first bars 238a and the plurality of second bars 238c.

For example, when each of the plurality of first bars 238a and the plurality of second bars 238c of the second electrode 238 has a first width w1, the second width w2 of the dielectric pattern 240 on each of the plurality of first bars 238a and the plurality of second bars 238c may be within a range of about 25% to about 50% of the first width w1.

The liquid crystal layer 260 includes a plurality of liquid crystal molecules 262. The liquid crystal molecule 262 on an edge portion of the plurality of first bars 238a and the plurality of second bars 238c of the second electrode 238 may have a second tilt angle a2 with respect to the first substrate 220 and have a second twist angle b2 with respect to the first direction after an electric field is generated. Since the electric field is modified by the dielectric pattern 240, the second tilt angle a2 of the second embodiment may be smaller than the first tilt angle a1 of the first embodiment (a2<a1) and the second twist angle b2 of the second embodiment may be greater than the first twist angle b1 of the first embodiment (b2>b1).

For example, the second tilt angle a2 may be smaller than the first tilt angle a1 by about 0.6 degrees (a2−a1=−0.6°), and the second twist angle b2 may be greater than the first twist angle b1 by about 45 degrees (b2−b1=+45°).

The liquid crystal layer 260 may be initially aligned along the first direction and the plurality of liquid crystal molecules 262 may have a positive dielectric anisotropy (Δε>0). Alternatively, the liquid crystal layer 260 may be initially aligned along the second direction and the plurality of liquid crystal molecules 262 may have a negative dielectric anisotropy (Δε<0).

In the LCD device 210, a voltage is applied to the first and second electrodes 234 and 238 to generate an electric field. An electric field along the second direction may be generated at a side extending along the first direction of the plurality of first bars 238a and the plurality of second bars 238c, and an electric field along the first direction may be generated at a side extending along the second direction of the plurality of first bars 238a and the plurality of second bars 238c and a side extending along the second direction of the first and second connecting parts 238b and 238d. An electric field along a diagonal direction between the first and second directions may be generated at a corner portion of the first, second and third openings op1, op2 and op3.

The liquid crystal molecule 262 at the corner portion of the first, second and third openings op1, op2 and op3, which is disposed along the first direction before the voltage is applied, rotates in preference to a clockwise direction or a counterclockwise direction by the electric field along the diagonal direction to be promptly realigned after the voltage is applied.

The liquid crystal molecule 262 at the side extending along the first direction of the plurality of first bars 238a and the plurality of second bars 238c, which is extended along the first direction before the voltage is applied, rotates without preference to a clockwise direction or a counterclockwise direction by the electric field along the second direction to be realigned after the voltage is applied. The liquid crystal molecule 262 at the side extending along the first direction of the plurality of first bars 238a and the plurality of second bars 238c is promptly realigned due to the realigned liquid crystal molecule 262 at the corner portion of the first, second and third openings op1, op2 and op3.

Accordingly, in the LCD device 210 according to the second embodiment, the liquid crystal layer 260 is driven by the electric field generated between the first and second electrodes 234 and 238. The liquid crystal molecule 262 at the corner portion of the first, second and third openings op1, op2 and op3 is promptly realigned in preference to a rotational direction, and the liquid crystal molecule 262 at the side extending along the first direction of the plurality of first bars 238a and the plurality of second bars 238c is promptly realigned due to the realignment of the liquid crystal molecule 262 at the corner portion of the first, second and third openings op1, op2 and op3. As a result, a response time defined as a sum of a rising time and a falling time of the liquid crystal molecule 262 is reduced and a response speed increases. Therefore, the LCD device 210 may be easily applied to virtual reality (VR) equipment.

For example, the rising time, the falling time and the response time of the liquid crystal molecule 262 may be about 7.53 msec, about 2.72 msec and about 10.25 msec, respectively.

In addition, since the second tilt angle a2 of the liquid crystal molecule 262 is reduced and the second twist angle b2 of the liquid crystal molecule 262 increases as compared with the related art LCD device due to the dielectric pattern 240 disposed on and protruding from the second electrode 238, the transmittance and the brightness increase.

Figure 6:
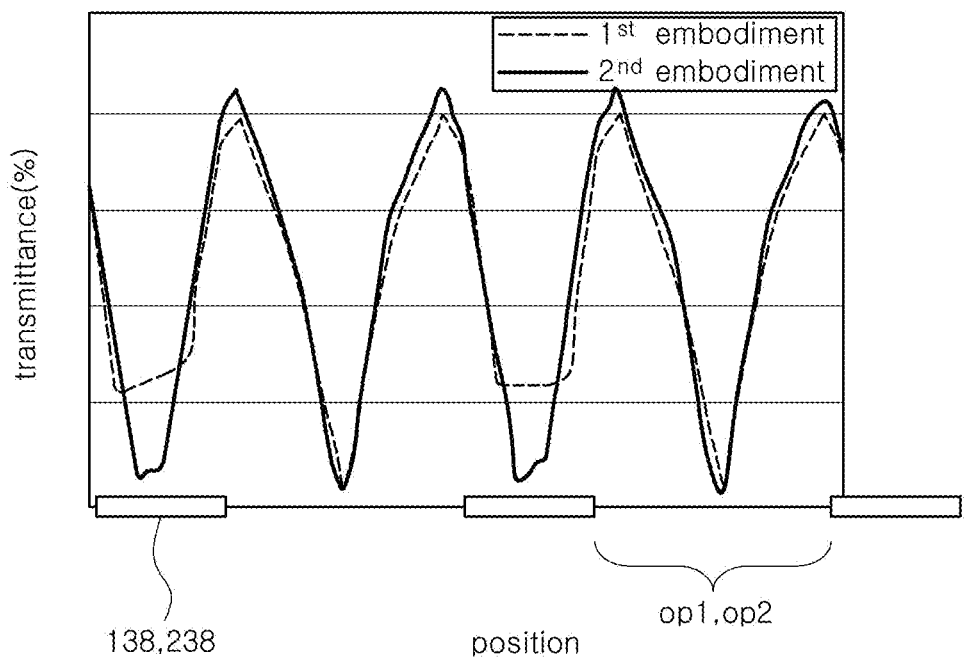
FIG. 6 is a graph showing a transmittance with respect to a position of a liquid crystal display device according to first and second embodiments of the present disclosure.
Figure 7:
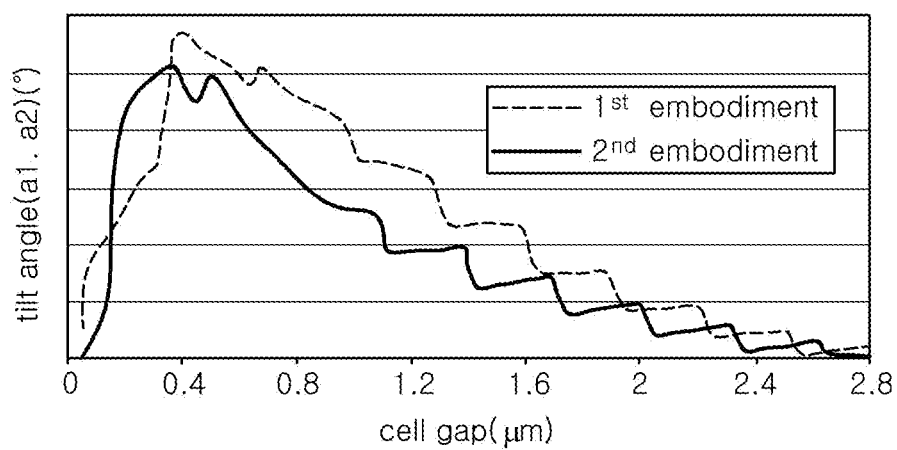
FIG. 7 is a graph showing a tilt angle of a liquid crystal molecule with respect to a cell gap of a liquid crystal display device according to a second embodiment of the present disclosure.
Figure 8:
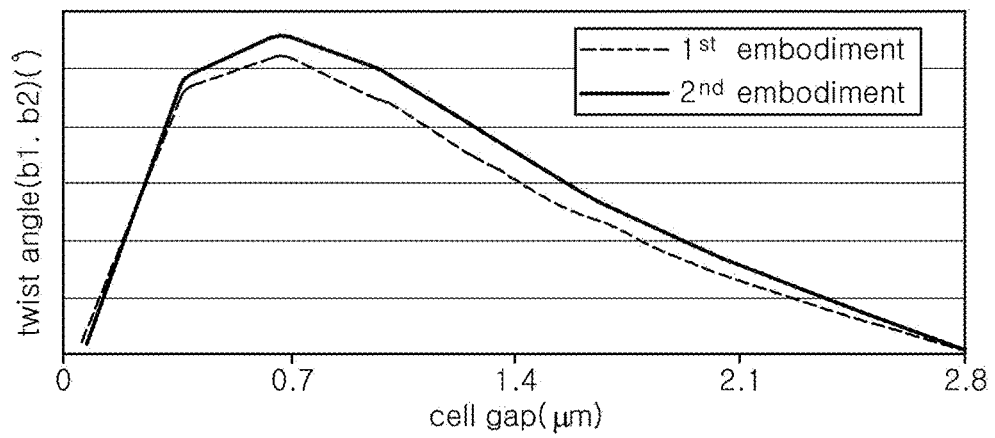
FIG. 8 is a graph showing a twist angle of a liquid crystal molecule with respect to a cell gap of a liquid crystal display device according to first and second embodiments of the present disclosure.

FIG. 6 is a graph showing a transmittance with respect to a position of a liquid crystal display device according to first and second embodiments of the present disclosure, FIG. 7 is a graph showing a tilt angle of a liquid crystal molecule with respect to a cell gap of a liquid crystal display device according to first and second embodiments of the present disclosure, and FIG. 8 is a graph showing a twist angle of a liquid crystal molecule with respect to a cell gap of a liquid crystal display device according to first and second embodiments of the present disclosure. Reference is made to FIGS. 2 to 5 with FIGS. 6 to 8.

In FIG. 6, the LCD device 110 and 210 according to the first and second embodiments of the present disclosure may have a relatively low transmittance at a central portion of the plurality of first bars 138a and 238a and the plurality of second bars 138c and 238c of the second electrode 138 and 238 and a central portion of the first and second openings op1 and op2 and may have a relatively high transmittance at an edge portion of the plurality of first bars 138a and 238a and the plurality of second bars 138c and 238c of the second electrode 138 and 238.

The transmittance at the edge portion of the plurality of first bars 238a and the plurality of second bars 238c of the second electrode 238 of the LCD device 210 according to the second embodiment may be greater than the transmittance at the edge portion of the plurality of first bars 138a and the plurality of second bars 138c of the second electrode 138 of the LCD device 110 according to the first embodiment.

For example, at the edge portion of the plurality of first bars 138a and 238a and the plurality of second bars 138c and 238c of the second electrode 138 and 238, the transmittance of the LCD device 210 according to the second embodiment may be greater than the transmittance of the LCD device 110 according to the first embodiment by about 6%.

In FIGS. 7 and 8, the first and second tilt angles a1 and a2 and the first and second twist angles b1 and b2 of the LCD device 110 and 210 according to the first and second embodiments of the present disclosure increase and then decrease according to a cell gap. The second tilt angle a2 of the LCD device 210 according to the second embodiment may be smaller than the first tilt angle a1 of the LCD device 110 according to the first embodiment, and the second twist angle b2 of the LCD device 210 according to the second embodiment may be greater than the first twist angle b1 of the LCD device 110 according to the first embodiment.

As a result, the transmittance at the edge portion of the plurality of first bars 238a and the plurality of second bars 238c of the second electrode 238 of the LCD device 210 according to the second embodiment may be greater than the transmittance at the edge portion of the plurality of first bars 138a and the plurality of second bars 138c of the second electrode 138 of the LCD device 110 according to the first embodiment.

In the LCD device 210 according to the second embodiment of the present disclosure, since the liquid crystal layer 260 is driven by using the first electrode 234 having a plate shape and the second electrode 238 including the plurality first bars 238a and the plurality of second bars 238c, a response time defined as a sum of a rising time and a falling time of the liquid crystal molecule 262 is reduced and a response speed increases. Therefore, the LCD device 210 may be easily applied to virtual reality (VR) equipment.

Further, since the tilt angle of the liquid crystal molecule 262 is reduced and the twist angle of the liquid crystal molecule 262 increases due to the dielectric pattern 240 disposed on and protruding from the second electrode 238, the transmittance and the brightness of the LCD device 210 are improved.

In another embodiment, to improve reduction of the contrast ratio due to the disclination of the LCD device 110 of the first embodiment, a black matrix may be formed to correspond to the second electrode 138 and the first, second and third openings op1, op2 and op3.

Figure 9:
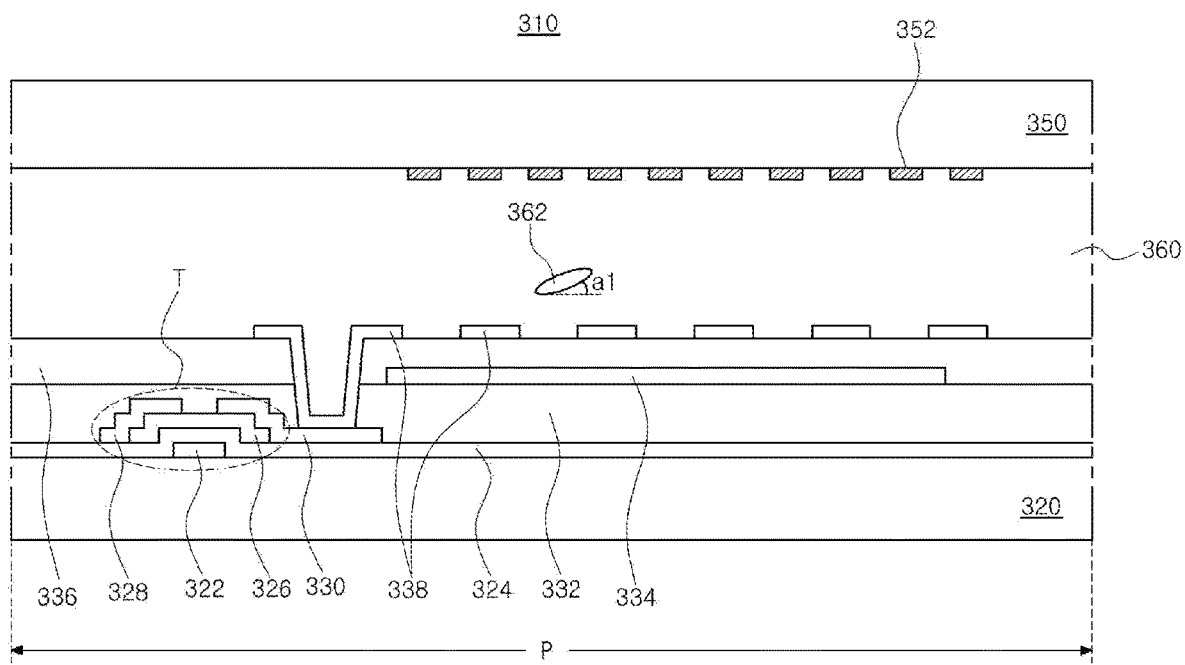
FIG. 9 is a cross-sectional view showing a liquid crystal display device according to a third embodiment of the present disclosure.
Figure 10:
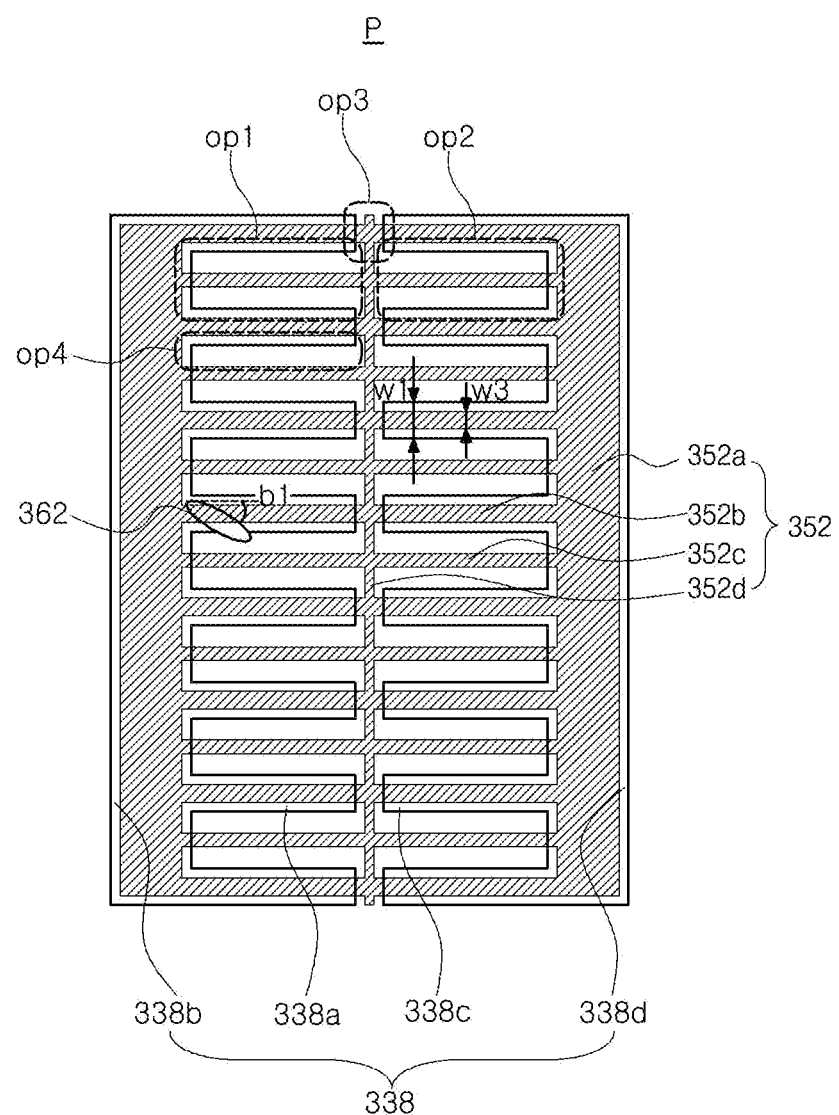
FIG. 10 is a plan view showing a second electrode and a black matrix of a liquid crystal display device according to a third embodiment of the present disclosure.

FIG. 9 is a cross-sectional view showing a liquid crystal display device according to a third embodiment of the present disclosure, and FIG. 10 is a plan view showing a second electrode and a black matrix of a liquid crystal display device according to a third embodiment of the present disclosure. Illustration of parts the same as the first embodiment may be omitted.

In FIGS. 9 and 10, a liquid crystal display (LCD) device 310 according to a third embodiment of the present disclosure includes first and second substrates 320 and 350 facing and spaced apart from each other and a liquid crystal layer

360 between the first and second substrates 320 and 350. The first and second substrates 320 and 350 include a plurality of pixel regions P.

A thin film transistor (TFT) T and first and second electrodes 334 and 338 are disposed in each of the plurality of pixel regions P on an inner surface of the first substrate 320. A gate electrode 322 is disposed in each of the plurality of pixel regions P on the inner surface of the first substrate 320, and a gate insulating layer 324 is disposed on the gate electrode 322 in a whole of the first substrate 320.

A semiconductor layer 326 is disposed on the gate insulating layer 324 corresponding to the gate electrode 322, and a source electrode 328 and a drain electrode 330 spaced apart from each other are disposed on both end portions of the semiconductor layer 326.

The gate electrode 322, the semiconductor layer 326, the source electrode 328 and the drain electrode 330 constitute the TFT T.

Although not shown, a gate line and a data line are disposed over the first substrate 320 and the TFT T is connected to the gate line and the data line. The gate line and the data line crossing each other adjacent to the pixel region P.

A first insulating layer 332 is disposed on the TFT T in a whole of the first substrate 320, and a first electrode 334 of a plate shape is disposed on the first insulating layer 332 in each pixel region P.

A second insulating layer 336 is disposed on the first electrode 334 in a whole of the first substrate 320, and a second electrode 338 of a bar shape is disposed on the second insulating layer 336 corresponding to the first electrode 334.

The second electrode 338 is connected to the drain electrode 330 of the TFT T through a drain contact hole of the first and second insulating layers 332 and 336. The second electrode 338 may include a plurality of first bars 338*a*, a first connecting part 338*b*, a plurality of second bars 338*c* and a second connecting part 338*d*. The plurality of first bars 338*a* are extended along a first direction parallel to the gate line. The first connecting part 338*b* connects the plurality of first bars 338*a* and is extended along a second direction parallel to the data line. The plurality of second bars 338*c* are symmetric to the plurality of first bars 338*a* with respect to a central line of the pixel region P and are extended along the first direction. The second connecting part 338*d* connects the plurality of second bars 338*c* and is extended along the second direction.

The second electrode 338 has a first opening op1 between the plurality of first bars 338*a*, a second opening op2 between the plurality of second bars 338*c* and a third opening op3 between the plurality of first bars 338*a* and the plurality of second bars 338*c*.

For example, a length of a side extending along the second direction of the first and second openings op1 and op2, which is a gap distance between adjacent two of the plurality of first bars 338*a* and is a gap distance between adjacent two of the plurality of second bars 338*c*, may be about 1 µm to about 5 µm.

A length of a side along the first direction of the third opening op3, which is a gap distance between the plurality of first bars 338*a* and the plurality of second bars 338*c*, may be about 3% to about 15% of a length of a side along the first direction of the pixel region P and may be about 5% to about 20% of a length of a side along the first direction of the second electrode 338. For example, the length of a side along the first direction of the third opening op3 may be about 1 µm to about 5 µm.

Although the first electrode 334 is a common electrode and the second electrode 338 is a pixel electrode connected to the TFT T in the third embodiment, the first electrode 334 may be a pixel electrode connected to the TFT T and the second electrode 338 may be a common electrode in another embodiment.

A black matrix 352 corresponding to the second electrode 338 and the first, second and third openings op1, op2 and op3 is disposed on an inner surface of the second substrate 350.

The black matrix 352 covers non-emissive elements such as the gate line, the data line and the TFT T. In addition, the black matrix 352 covers a disclination in the pixel region P to reduce the brightness of the black image and thereby increases the contrast ratio.

A vertical electric field is generated at a central portion of the plurality of first bars 338*a* and the plurality of second bars 338*c* of the second electrode 338 to cause the disclination. As a result, the brightness of the black image may increase due to the disclination.

To prevent increase of the brightness of the black image, the black matrix 352 includes first, second, third and fourth blocking parts 352*a*, 352*b*, 352*c* and 352*d*. The first blocking part 352*a* has a bar shape along the second direction corresponding to the first and second connecting parts 338*b* and 338*d* of the second electrode 338. The second blocking part 352*b* has a bar shape along the first direction corresponding to the central portion of the plurality of first bars 338*a* and the plurality of second bars 338*c* of the second electrode 338. The third blocking part 352*c* has a bar shape along the first direction corresponding to the central portion of the first and second openings op1 and op2. The fourth blocking part 352*d* has a bar shape along the second direction corresponding to the central portion of the third opening op3.

As a result, the black matrix 352 has a lattice shape including the first, second, third and fourth blocking parts 352*a*, 352*b*, 352*c* and 352*d* of bar shapes connected to each other and along the first and second directions. The first, second, third and fourth blocking parts 352*a*, 352*b*, 352*c* and 352*d* constitute a fourth opening op4 exposing edge portions of the plurality of first bars 338*a* and the plurality of second bars 338*c* of the second electrode 338.

Each of the second and third blocking parts 352*b* and 352*c* of the black matrix 352 may have a third width w3 substantially the same as a width of the disclination.

For example, when each of the plurality of first bars 338*a* and the plurality of second bars 338*c* of the second electrode 338 has a first width w1, the third width w3 of each of the second and third blocking parts 352*b* and 352*c* of the black matrix 352 may be within a range of about 25% to about 50% of the first width w1.

The liquid crystal layer 360 includes a plurality of liquid crystal molecules 362. The liquid crystal molecule 362 on an edge portion of the plurality of first bars 338*a* and the plurality of second bars 338*c* of the second electrode 338 may have a first tilt angle a1 with respect to the first substrate 320 and have a first twist angle b1 with respect to the first direction after an electric field is generated.

The liquid crystal layer 360 may be initially aligned along the first direction and the plurality of liquid crystal molecules 362 may have a positive dielectric anisotropy ($\Delta\varepsilon>0$). Alternatively, the liquid crystal layer 360 may be initially aligned along the second direction and the plurality of liquid crystal molecules 362 may have a negative dielectric anisotropy ($\Delta\varepsilon<0$).

In the LCD device 310, a voltage is applied to the first and second electrodes 334 and 338 to generate an electric field. An electric field along the second direction may be generated at a side extending along the first direction of the plurality of first bars 338a and the plurality of second bars 338c, and an electric field along the first direction may be generated at a side extending along the second direction of the plurality of first bars 338a and the plurality of second bars 338c and a side extending along the second direction of the first and second connecting parts 338b and 338d. An electric field along a diagonal direction between the first and second directions may be generated at a corner portion of the first, second and third openings op1, op2 and op3.

The liquid crystal molecule 362 at the corner portion of the first, second and third openings op1, op2 and op3, which is disposed along the first direction before the voltage is applied, rotates in preference to a clockwise direction or a counterclockwise direction by the electric field along the diagonal direction to be promptly realigned after the voltage is applied.

The liquid crystal molecule 362 at the side along the first direction of the plurality of first bars 338a and the plurality of second bars 338c, which is extended along the first direction before the voltage is applied, rotates without preference to a clockwise direction or a counterclockwise direction by the electric field along the second direction to be realigned after the voltage is applied. The liquid crystal molecule 362 at the side along the first direction of the plurality of first bars 338a and the plurality of second bars 338c is promptly realigned due to the realigned liquid crystal molecule 362 at the corner portion of the first, second and third openings op1, op2 and op3.

Accordingly, in the LCD device 310 according to the third embodiment, the liquid crystal layer 360 is driven by the electric field generated between the first and second electrodes 334 and 338. The liquid crystal molecule 362 at the corner portion of the first, second and third openings op1, op2 and op3 is promptly realigned in preference to a rotational direction, and the liquid crystal molecule 362 at the side along the first direction of the plurality of first bars 338a and the plurality of second bars 338c is promptly realigned due to the realignment of the liquid crystal molecule 362 at the corner portion of the first, second and third openings op1, op2 and op3. As a result, a response time defined as a sum of a rising time and a falling time of the liquid crystal molecule 362 is reduced and a response speed increases. Therefore, the LCD device 310 may be easily applied to virtual reality (VR) equipment.

For example, the rising time, the falling time and the response time of the liquid crystal molecule 362 may be about 4.1 msec, about 3.8 msec and about 7.9 msec, respectively.

In addition, since the disclination corresponding to the central portion of the second electrode 338 and the central portion of the first, second and third openings op1, op2 and op3 is blocked by the black matrix 352, a contrast ratio increases.

Figures 11, 12:
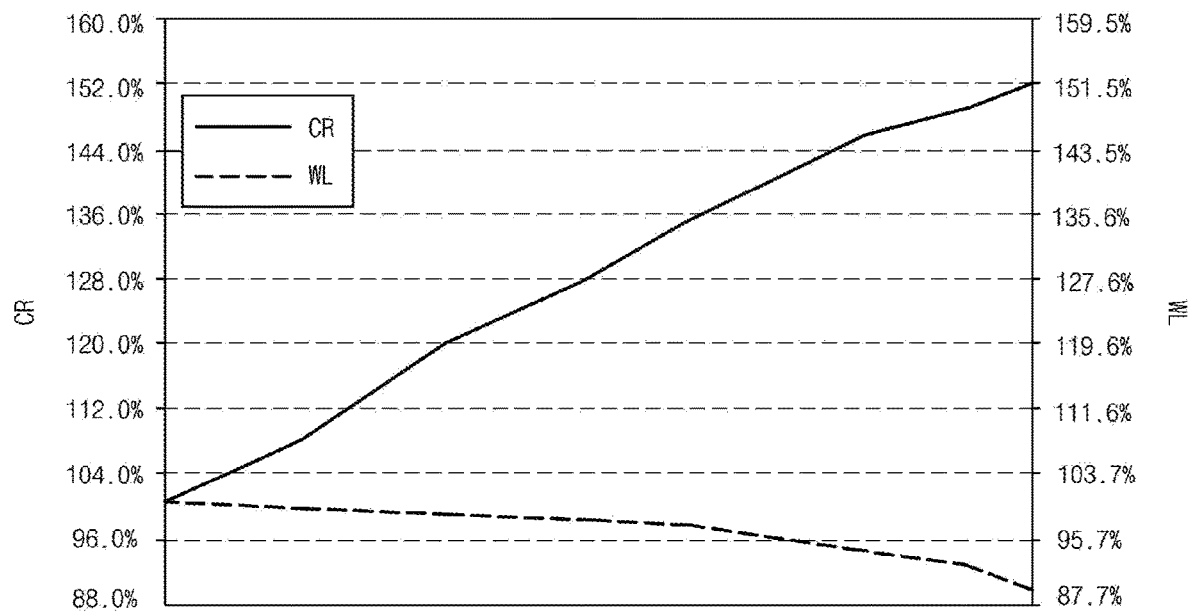
FIG. 11 is a graph showing a contrast ratio and a white luminance with respect to a width of a black matrix of a liquid crystal display device according to a third embodiment of the present disclosure.
FIG. 12 is a table illustrating a contrast ratio and a white luminance with respect to a width of a black matrix of a liquid crystal display device according to a third embodiment of the present disclosure.

FIG. 11 is a graph showing a contrast ratio and a white luminance with respect to a width of a black matrix of a liquid crystal display device according to a third embodiment of the present disclosure, and FIG. 12 is a table illustrating a contrast ratio and a white luminance with respect to a width of a black matrix of a liquid crystal display device according to a third embodiment of the present disclosure. Reference is made to FIGS. 9 and 10 with FIGS. 11 and 12.

In FIGS. 11 and 12, since a light leakage through the disclination of the central portion of the second electrode 338 and the central portion of the first, second and third openings op1, op2 and op3 is prevented by the second, third and fourth blocking parts 352b, 352c and 352d of the black matrix 352, a black luminance of the LCD device 310 according to the third embodiment of the present disclosure is reduced and the contrast ratio (CR) of the LCD device 310 according to the third embodiment of the present disclosure increases as compared with the LCD device 110 according to the first embodiment.

The contrast ratio increases as the width of the second, third and fourth blocking parts 352b, 352c and 352d of the black matrix 352 increases.

For example, when the third width w3 of the second and third blocking parts 352b and 352c of the black matrix 352 is about 0.4 µm, about 0.8 µm, about 1.2 µm, about 1.5 µm, about 2.0 µm, about 2.3 µm and about 2.5 µm, the contrast ratio of the LCD device 310 of the third embodiment may be about 108.0%, about 119.7%, about 127.7%, about 134.9%, about 145.6%, about 149.3% and about 152.2%, respectively, as compared with the contrast ratio of 100% of the LCCD device 110 of the first embodiment. As a result, the contrast ratio of the LCD device 310 of the third embodiment may increase by about 8.0%, about 19.7%, about 27.7%, about 34.9%, about 45.6%, about 49.3% and 52.2%, respectively, as compared with the LCD device 110 of the first embodiment.

Although a white luminance (WL) may be reduced by the black matrix 352, reduction in the white luminance to an acceptable level may be offset by the increase of the contrast ratio.

In addition, reduction in the white luminance may be minimized by applying the black matrix 352 of the third embodiment to the LCD device 210 of the second embodiment where the transmittance and the brightness are improved.

In the LCD device 310 according to the third embodiment of the present disclosure, since the liquid crystal layer 360 is driven by using the first electrode 334 of a plate shape and the second electrode 338 including the plurality first bars 338a and the plurality of second bars 338c, a response time defined as a sum of a rising time and a falling time of the liquid crystal molecule 362 is reduced and a response speed increases. Therefore, the LCD device 310 may be easily applied to virtual reality (VR) equipment.

Further, since the light leakage through the disclination is prevented by the black matrix 352 corresponding to the central portion of the plurality of first bars 338a and the plurality of second bars 338c of the second electrode 338 and the central portion of the first, second and third openings op1, op2 and op3, the contrast ratio of the LCD device 310 increases.

In another embodiment, to improve reduction of the transmittance and the white luminance due to the disclination of the LCD device 110 of the first embodiment, first and second liquid crystal capsule layers 468 and 482 (of FIG. 13) functioning as a quarter wave plate (QWP) in an ON state may be formed on outer surfaces of the first and second substrates 120 and 150, respectively.

Figure 13:
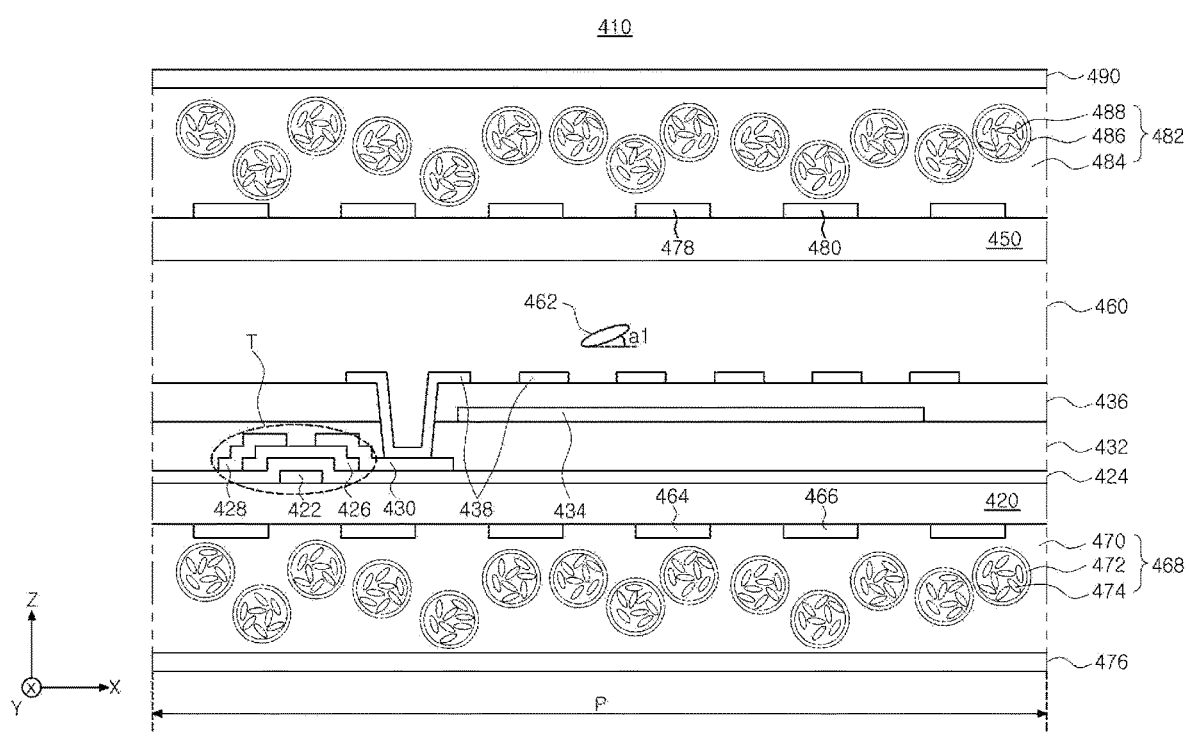
FIG. 13 is a cross-sectional view showing a liquid crystal display device according to a fourth embodiment of the present disclosure.
Figure 14:
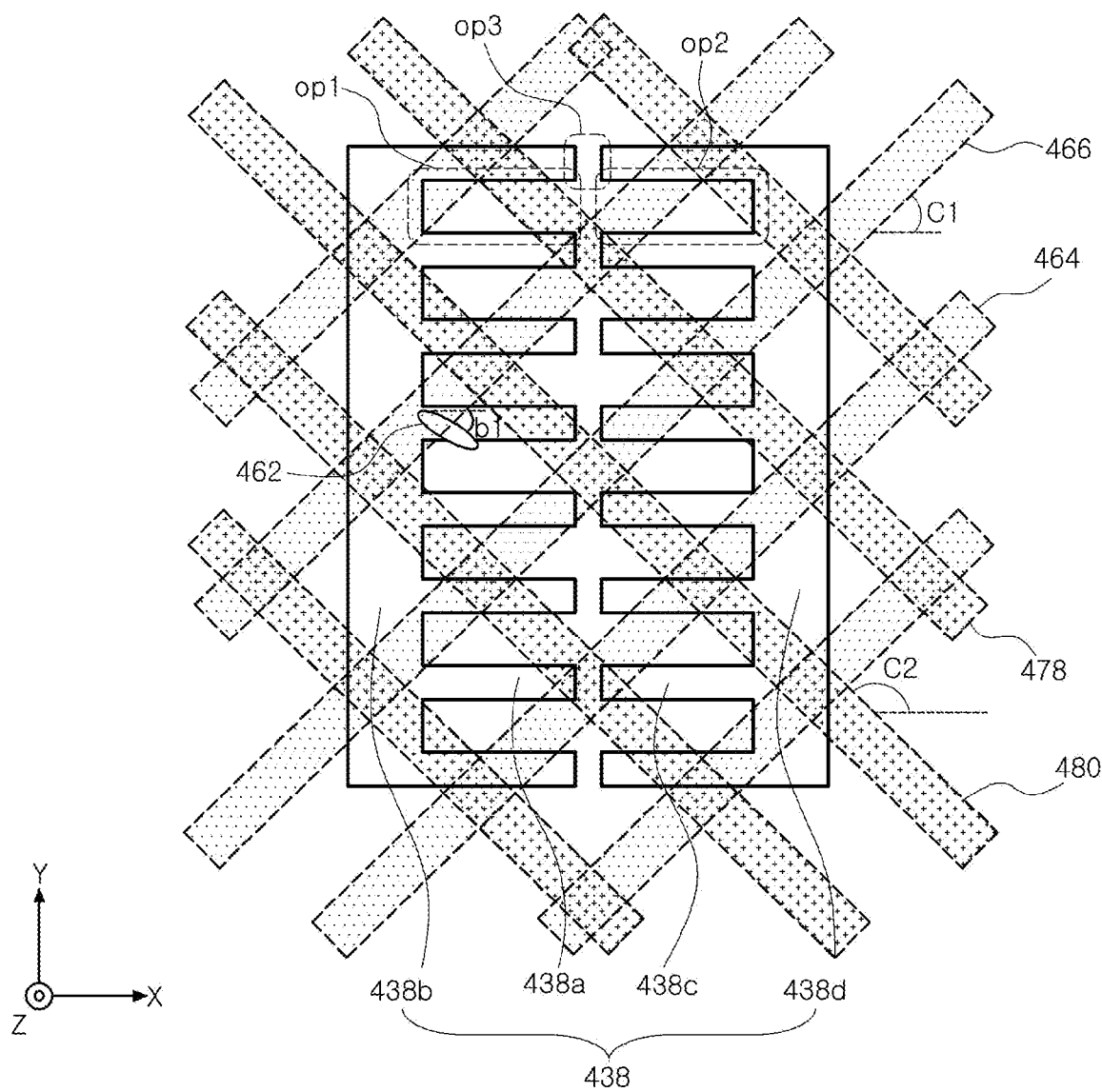
FIG. 14 is a plan view showing a second electrode, first and second capsule electrodes and third and fourth capsule electrodes of a liquid crystal display device according to a fourth embodiment of the present disclosure.

FIG. 13 is a cross-sectional view showing a liquid crystal display device according to a fourth embodiment of the present disclosure, and FIG. 14 is a plan view showing a second electrode, first and second capsule electrodes and third and fourth capsule electrodes of a liquid crystal display device according to a fourth embodiment of the present disclosure. Illustration of parts the same as the first embodiment may be omitted.

In FIGS. 13 and 14, a liquid crystal display (LCD) device 410 according to a fourth embodiment of the present disclosure includes first and second substrates 420 and 450 facing and spaced apart from each other, a liquid crystal layer 460 between the first and second substrates 420 and 450, a first liquid crystal capsule layer 468 and a first polarizing plate 476 sequentially on an outer surface of the first substrate 420, and a second liquid crystal capsule layer 482 and a second polarizing plate 490 sequentially on an outer surface of the second substrate 450. The first and second substrates 420 and 450 include a plurality of pixel regions P.

A thin film transistor (TFT) T and first and second electrodes 434 and 438 are disposed in each of the plurality of pixel regions P on an inner surface of the first substrate 420. A gate electrode 422 is disposed in each of the plurality of pixel regions P on the inner surface of the first substrate 420, and a gate insulating layer 424 is disposed on the gate electrode 422 in a whole of the first substrate 420.

A semiconductor layer 426 is disposed on the gate insulating layer 424 corresponding to the gate electrode 422, and a source electrode 428 and a drain electrode 430 spaced apart from each other are disposed on both end portions of the semiconductor layer 426.

The gate electrode 422, the semiconductor layer 426, the source electrode 428 and the drain electrode 430 constitute the TFT T.

Although not shown, a gate line and a data line are disposed over the first substrate 420 and the TFT T is connected to the gate line and the data line. The gate line and the data line cross each other to form the pixel region P adjacent to the crossing location.

A first insulating layer 432 is disposed on the TFT T in a whole of the first substrate 420, and a first electrode 434 of a plate shape is disposed on the first insulating layer 432 in each pixel region P.

A second insulating layer 436 is disposed on the first electrode 434 in a whole of the first substrate 420, and a second electrode 438 of a bar shape is disposed on the second insulating layer 436 corresponding to the first electrode 434.

The second electrode 438 is connected to the drain electrode 430 of the TFT T through a drain contact hole of the first and second insulating layers 432 and 436. The second electrode 438 may include a plurality of first bars 438a, a first connecting part 438b, a plurality of second bars 438c and a second connecting part 438d. The plurality of first bars 438a are extended along a first direction X parallel to the gate line. The first connecting part 438b connects the plurality of first bars 438a and is extended along a second direction Y parallel to the data line. The plurality of second bars 438c are symmetric to the plurality of first bars 438a with respect to a central line of the pixel region P and are extended along the first direction X. The second connecting part 438d connects the plurality of second bars 438c and is extended along the second direction Y.

The second electrode 438 has a first opening op1 between the plurality of first bars 438a, a second opening op2 between the plurality of second bars 438c and a third opening op3 between the plurality of first bars 438a and the plurality of second bars 438c.

For example, a length of a side extending along the second direction of the first and second openings op1 and op2, which is a gap distance between adjacent two of the plurality of first bars 438a and is a gap distance between adjacent two of the plurality of second bars 438c, may be about 1 μm to about 5 μm.

A length of a side along the first direction X of the third opening op3, which is a gap distance between the plurality of first bars 438a and the plurality of second bars 438c, may be about 3% to about 15% of a length of a side along the first direction X of the pixel region P and may be about 5% to about 20% of a length of a side along the first direction X of the second electrode 438. For example, the length of a side along the first direction X of the third opening op3 may be about 1 μm to about 5 μm.

Although the first electrode 434 is a common electrode and the second electrode 438 is a pixel electrode connected to the TFT T in the fourth embodiment, the first electrode 434 may be a pixel electrode connected to the TFT T and the second electrode 438 may be a common electrode in another embodiment.

The liquid crystal layer 460 includes a plurality of liquid crystal molecules 462. The liquid crystal molecule 462 on an edge portion of the plurality of first bars 438a and the plurality of second bars 438c of the second electrode 438 may have a first tilt angle a1 with respect to the first substrate 420 and have a first twist angle b1 with respect to the first direction X after an electric field is generated.

The liquid crystal layer 460 may be initially aligned along the first direction X and the plurality of liquid crystal molecules 462 may have a positive dielectric anisotropy ($\Delta\varepsilon>0$). Alternatively, the liquid crystal layer 460 may be initially aligned along the second direction Y and the plurality of liquid crystal molecules 462 may have a negative dielectric anisotropy ($\Delta\varepsilon<0$).

First and second capsule electrodes 464 and 466 each having a bar shape are disposed on an outer surface of the first substrate 420, and a first liquid crystal capsule layer 468 is disposed on the first and second capsule electrodes 464 and 466. The first and second capsule electrodes 464 and 466 are parallel to and spaced apart from each other.

Each of the first and second capsule electrodes 464 and 466 may be obliquely disposed to have a first oblique angle C1 with respect to the first direction X. For example, the first oblique angle C1 may be about 45 degrees.

The first liquid crystal capsule layer 468 includes a first binder 470 and a plurality of first liquid crystal capsules 472 dispersed in the first binder 470. Each of the plurality of first liquid crystal capsules 472 includes a plurality of first liquid crystal molecules 474.

A thickness of the first liquid crystal capsule layer 468 may be changed according to a birefringence property and an optical transmittance of the first liquid crystal capsule 472. For example, the thickness of the first liquid crystal capsule layer 468 may be within a range of about 1 μm to about 6 μm.

The first binder 470 disperses the plurality of first liquid crystal capsules 472. For example, the first binder 470 may be transparent or translucent (e.g., half-transparent) and may have a water solubility, a fat solubility or a mixed property of a water solubility and a fat solubility.

Each of the plurality of first liquid crystal capsules 472 is a polymer capsule having a diameter of 1 to 999 nanometers and includes a water soluble material such as poly vinyl alcohol (PVA) or a fat soluble material such as poly methyl methacrylate (PMMA). Each of the plurality of first liquid crystal capsules 472 may have a diameter within a range of about 1 nm to about 320 nm.

The plurality of first liquid crystal molecules 474 may include at least one of a nematic liquid crystal, a ferroelectric liquid crystal and a flexo electric liquid crystal.

Since the first liquid crystal capsule layer 468 including the first binder 470 and the plurality of first liquid crystal capsules 472 may be formed without an additional orientation layer, the first liquid crystal capsule layer 468 may directly contact the first and second capsule electrodes 464 and 466.

The plurality of first liquid crystal molecules 474 may be initially randomly aligned in the plurality of first liquid crystal capsules 472 such that a long axis of each first liquid crystal molecule 474 forms a random angle with respect to a normal line of the first substrate 420 (e.g., initial random alignment).

A first polarizing plate 476 is disposed on the first liquid crystal capsule layer 468. The first polarizing plate 476 may be a linear polarizing plate where a transmission axis is parallel to the first direction X.

Third and fourth capsule electrodes 478 and 480 each having a bar shape are disposed on an outer surface of the second substrate 450, and a second liquid crystal capsule layer 482 is disposed on the third and fourth capsule electrodes 478 and 480. The third and fourth capsule electrodes 478 and 480 are parallel to and spaced apart from each other.

Each of the third and fourth capsule electrodes 478 and 480 may be obliquely disposed to have a second oblique angle C2 with respect to the first direction X. The first and second oblique angles C1 and C2 may be different from each other. For example, the second oblique angle C2 may be about 135 degrees.

The second liquid crystal capsule layer 482 includes a second binder 484 and a plurality of second liquid crystal capsules 486 dispersed in the second binder 484. Each of the plurality of second liquid crystal capsules 486 includes a plurality of second liquid crystal molecules 488.

A thickness of the second liquid crystal capsule layer 482 may be changed according to a birefringence property and an optical transmittance of the second liquid crystal capsule 486. For example, the thickness of the second liquid crystal capsule layer 482 may be within a range of about 1 μm to about 6 μm.

The second binder 484 disperses the plurality of second liquid crystal capsules 486. For example, the second binder 484 may be transparent or translucent (e.g., half-transparent) and may have a water solubility, a fat solubility or a mixed property of a water solubility and a fat solubility.

Each of the plurality of second liquid crystal capsules 486 is a polymer capsule having a diameter of 1 to 999 nanometers and includes a water soluble material such as poly vinyl alcohol (PVA) or a fat soluble material such as poly methyl methacrylate (PMMA). Each of the plurality of second liquid crystal capsules 486 may have a diameter within a range of about 1 nm to about 320 nm.

The plurality of second liquid crystal molecules 488 may include at least one of a nematic liquid crystal, a ferroelectric liquid crystal and a flexo electric liquid crystal.

Since the second liquid crystal capsule layer 482 including the second binder 484 and the plurality of second liquid crystal capsules 486 may be formed without an additional orientation layer, the second liquid crystal capsule layer 482 may directly contact the third and fourth capsule electrodes 478 and 480.

The plurality of second liquid crystal molecules 488 may be initially randomly aligned in the plurality of second liquid crystal capsules 486 such that a long axis of each second liquid crystal molecule 488 forms a random angle with respect to a normal line of the second substrate 450 (e.g., initial random alignment).

The first and second binders 470 and 484 may be the same as or different from each other, the first and second liquid crystal capsules 472 and 486 may be the same as or different from each other, and the first and second liquid crystal molecules 474 and 488 may be the same as or different from each other.

A second polarizing plate 490 is disposed on the second liquid crystal capsule layer 482. The second polarizing plate 490 may be a linear polarizing plate where a transmission axis is parallel to the second direction Y.

In the LCD device 410, a voltage is applied to the first and second electrodes 434 and 438 to generate an electric field. An electric field along the second direction Y may be generated at a side along the first direction X of the plurality of first bars 438a and the plurality of second bars 438c, and an electric field along the first direction X may be generated at a side along the second direction Y of the plurality of first bars 438a and the plurality of second bars 438c and a side along the second direction Y of the first and second connecting parts 438b and 438d. An electric field along a diagonal direction between the first and second directions X and Y may be generated at a corner portion of the first, second and third openings op1, op2 and op3.

The liquid crystal molecule 462 at the corner portion of the first, second and third openings op1, op2 and op3, which is disposed along the first direction X before the voltage is applied, rotates in preference to a clockwise direction or a counterclockwise direction by the electric field along the diagonal direction to be promptly realigned after the voltage is applied.

The liquid crystal molecule 462 at the side along the first direction X of the plurality of first bars 438a and the plurality of second bars 438c, which is extended along the first direction X before the voltage is applied, rotates without preference to a clockwise direction or a counterclockwise direction by the electric field along the second direction Y to be realigned after the voltage is applied. The liquid crystal molecule 462 at the side along the first direction X of the plurality of first bars 438a and the plurality of second bars 438c is promptly realigned due to the realigned liquid crystal molecule 462 at the corner portion of the first, second and third openings op1, op2 and op3.

Accordingly, in the LCD device 410 according to the fourth embodiment, the liquid crystal layer 460 is driven by the electric field generated between the first and second electrodes 434 and 438. The liquid crystal molecule 462 at the corner portion of the first, second and third openings op1, op2 and op3 is promptly realigned in preference to a rotational direction, and the liquid crystal molecule 462 at the side along the first direction X of the plurality of first bars 438a and the plurality of second bars 438c is promptly realigned due to the realignment of the liquid crystal molecule 462 at the corner portion of the first, second and third openings op1, op2 and op3. As a result, a response time defined as a sum of a rising time and a falling time of the liquid crystal molecule 462 is reduced and a response speed increases. Therefore, the LCD device 410 may be easily applied to virtual reality (VR) equipment.

For example, the rising time, the falling time and the response time of the liquid crystal molecule 462 may be about 4.1 msec, about 3.8 msec and about 7.9 msec, respectively.

In addition, since the first and second liquid crystal capsule layers 468 and 482 on the outer surfaces of the first and second substrates 420 and 450 are used as a quarter wave plate (QWP), a light is transmitted even through the disclination.

Figure 15A:
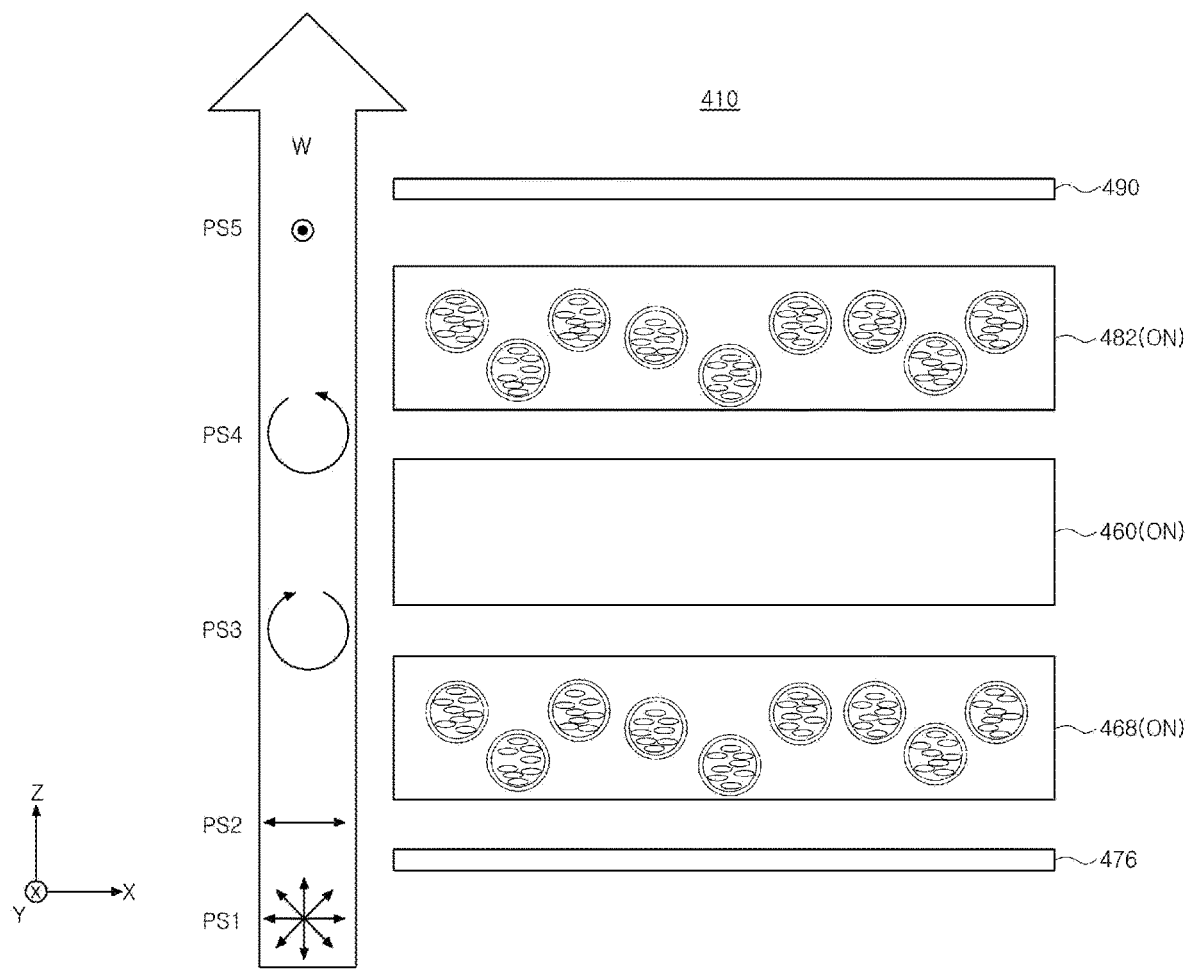
FIGS. 15A and 15B are cross-sectional views showing a polarization state of an ON state and an OFF state, respectively, of a liquid crystal display device according to a fourth embodiment of the present disclosure.
Figure 15B:
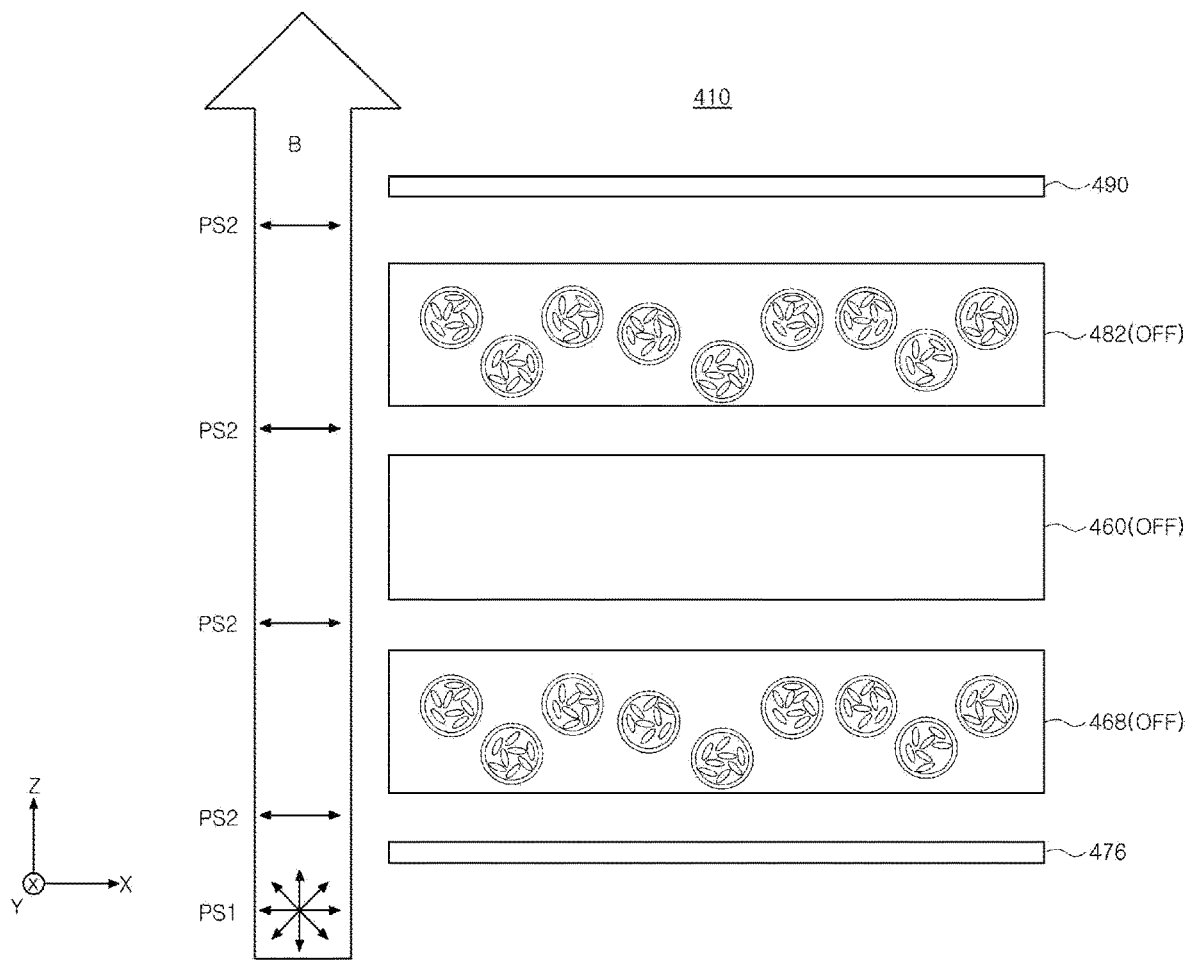

FIGS. 15A and 15B are cross-sectional views showing a polarization state of an ON state and an OFF state, respectively, of a liquid crystal display device according to a fourth embodiment of the present disclosure. Reference is made to FIGS. 13 and 14 with FIGS. 15A and 15B. For convenience of illustration, only the first and second polarizing plates 476 and 490, the first and second liquid crystal capsule layers 468 and 482 and the liquid crystal layer 460 influencing the polarization state are shown in FIGS. 15A and 15B.

In FIG. 15A, when the LCD device 410 has an ON state where a white image is displayed, a backlight unit (not shown) under the first polarizing plate 476 transmits a light of a first polarization state PS1 of non-polarization to the first polarizing plate 476 having a transmission axis parallel to the first direction X.

A light of linear polarization parallel to the transmission axis of the first polarizing plate 476 among the light of the first polarization state PS1 selectively passes through the first polarizing plate 476, and the first polarizing plate 476 transmits a light of a second polarization state PS2 of linear polarization parallel to the first direction X to the first liquid crystal capsule layer 468.

In the ON state, a first capsule voltage is applied to the first and second capsule electrodes 464 and 466 to generate a horizontal electric field between the first and second capsule electrodes 464 and 466. As a result, the plurality of first liquid crystal molecules 474 of the plurality of first liquid crystal capsules 472 may be aligned parallel to the horizontal electric field, and the first liquid crystal capsule layer 468 may operate as a quarter wave plate (QWP) having a retardation of $\lambda/4$ ($\lambda$ is a wavelength of a light).

Since the QWP modifies a light of linear polarization to a light of circular polarization, the first liquid crystal capsule layer 468 functioning as the QWP may modify the light of the second polarization state PS2 of linear polarization to a light of a third polarization state PS3 of left-handed circular polarization and may transmit the light of the third polarization state PS3 to the liquid crystal layer 460.

In the ON state, a driving voltage is applied to the first and second electrodes 434 and 438 to generate a horizontal electric field between the first and second electrodes 434 and 438. As a result, the plurality of liquid crystal molecules 462 may be aligned parallel to the horizontal electric field, and the liquid crystal layer 460 may have a retardation of $\lambda/2$ ($\lambda$ is a wavelength of a light).

Since the horizontal electric field is not generated in the liquid crystal layer 460 corresponding to the central portion of the plurality of first bars 438a and the plurality of second bars 438c of the second electrode 438 and the central portion of the first, second and third openings op1, op2 and op3, the plurality of liquid crystal molecules 462 are not normally aligned. As a result, an incident light of linear polarization may not pass through the liquid crystal layer 460 corresponding to the central portion of the plurality of first bars 438a and the plurality of second bars 438c of the second electrode 438 and the central portion of the first, second and third openings op1, op2 and op3 to be displayed as a disclination.

However, in the LCD device 410 according to the fourth embodiment, since the light of the third polarization state PS3 of left-handed circular polarization is transmitted to the liquid crystal layer 460 of the ON state, the incident light of the third polarization state PS3 may pass through a whole region of the liquid crystal layer 460 including the central portion of the plurality of first bars 438a and the plurality of second bars 438c of the second electrode 438 and the central portion of the first, second and third openings op1, op2 and op3. As a result, the disclination may be prevented in the LCD device 410 of the ON state.

In addition, the liquid crystal layer 460 having the retardation of $\lambda/2$ may modify the light of the third polarization state PS3 of left-handed circular polarization to a light of a fourth polarization state PS4 of right-handed circular polarization and may transmit the light of the fourth polarization state PS4 to the second liquid crystal capsule layer 482.

In the ON state, a second capsule voltage is applied to the third and fourth capsule electrodes 478 and 480 to generate a horizontal electric field between the third and fourth capsule electrodes 478 and 480. As a result, the plurality of second liquid crystal molecules 488 of the plurality of second liquid crystal capsules 486 may be aligned parallel to the horizontal electric field, and the second liquid crystal capsule layer 482 may operate as a quarter wave plate (QWP) having a retardation of $\lambda/4$ ($\lambda$ is a wavelength of a light).

Since the QWP modifies a light of circular polarization to a light of linear polarization, the second liquid crystal capsule layer 482 functioning as the QWP may modify the light of the fourth polarization state PS4 of right-handed circular polarization to a light of a fifth polarization state PS5 of linear polarization parallel to the second direction Y and may transmit the light of the fifth polarization state PS5 to the second polarizing plate 490.

A whole of the light of the fifth polarization state PS5 passes through the second polarizing plate 490 having a transmission axis parallel to the second direction Y, and the LCD device 410 may display a white.

In FIG. 15B, when the LCD device 410 has an OFF state where a black image is displayed, a backlight unit (not shown) under the first polarizing plate 476 transmits a light of a first polarization state PS1 of non-polarization to the first polarizing plate 476 having a transmission axis parallel to the first direction X.

A light of linear polarization parallel to the transmission axis of the first polarizing plate 476 among the light of the first polarization state PS1 selectively passes through the first polarizing plate 476, and the first polarizing plate 476 transmits a light of a second polarization state PS2 of linear polarization parallel to the first direction X to the first liquid crystal capsule layer 468.

In the OFF state, a first capsule voltage is not applied to the first and second capsule electrodes 464 and 466 not to generate a horizontal electric field between the first and second capsule electrodes 464 and 466. As a result, the plurality of first liquid crystal molecules 474 of the plurality of first liquid crystal capsules 472 may maintain the initial random alignment, and the first liquid crystal capsule layer 468 may intactly transmit the light of the second polarization state PS2 of linear polarization parallel to the first direction X to the liquid crystal layer 460.

In the OFF state, a driving voltage is not applied to the first and second electrodes 434 and 438 not to generate a horizontal electric field between the first and second electrodes 434 and 438. As a result, the plurality of liquid crystal molecules 462 may maintain an initial alignment, and the liquid crystal layer 460 may intactly transmit the light of the second polarization state PS2 of linear polarization parallel to the first direction X to the second liquid crystal capsule layer 482.

In the OFF state, a second capsule voltage is not applied to the third and fourth capsule electrodes 478 and 480 not to generate a horizontal electric field between the third and fourth capsule electrodes 478 and 480. As a result, the plurality of second liquid crystal molecules 488 of the plurality of second liquid crystal capsules 486 may maintain the initial random alignment, and the second liquid crystal capsule layer 482 may intactly transmit the light of the second polarization state PS2 of linear polarization parallel to the first direction X to the second polarizing plate 490.

A whole of the light of the second polarization state PS2 of linear polarization parallel to the first direction X is absorbed by the second polarizing plate 490 having a transmission axis parallel to the second direction Y, and the LCD device 410 may display black without a light leakage.

In the LCD device 410 according to the fourth embodiment of the present disclosure, since the liquid crystal layer 460 is driven by using the first electrode 434 of a plate shape and the second electrode 438 including the plurality first bars 438a and the plurality of second bars 438c, a response time defined as a sum of a rising time and a falling time of the liquid crystal molecule 362 is reduced and a response speed increases. Therefore, the LCD device 310 may be easily applied to virtual reality (VR) equipment.

Further, in the ON state, since the first and second liquid crystal capsule layers 468 and 482 on the outer surfaces of the first and second substrates 420 and 450 function as the QWP such that the light of circular polarization passes through the liquid crystal layer 460, the light may be transmitted through the whole of the pixel region P including the disclination. As a result, transmittance and white luminance of the LCD device 410 may be improved.

Moreover, in the OFF state, since the first and second liquid crystal capsule layers 468 and 482 on the outer surfaces of the first and second substrates 420 and 450 have no retardation such that the light of linear polarization passes through the liquid crystal layer 460, a light leakage may be prevented. As a result, reduction of a contrast ratio may be prevented.

Consequently, in a liquid crystal display device according to the present disclosure, since a dielectric pattern having the same shape as an electrode is formed on the electrode having a plurality of openings, a tilt angle of a liquid crystal molecule is reduced and a twist angle of the liquid crystal molecule is increased. As a result, brightness is increased.

In addition, by forming a black matrix having a lattice shape disposed on the electrode and the opening, the response time is reduced and the brightness and the transmittance is increased. Further, black luminance is reduced and contrast ratio increased.

Further, since first and second liquid crystal capsule layers functioning as a quarter wave plate in an ON state is formed on outer surfaces of first and second substrates, the response time is reduced and the transmittance and the white luminance is increased.

It will be apparent to those skilled in the art that various modifications and variations can be made in the display device of the present disclosure without departing from the technical idea or scope of the disclosure. Thus, it is intended that the present disclosure cover the modifications and variations of this disclosure provided they come within the scope of the appended claims and their equivalents.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A liquid crystal display device, comprising:
   first and second substrates facing and spaced apart from each other, the first and second substrates having a pixel region;
   a gate line and a data line on an inner surface of the first substrate, the gate line and the data line crossing each other adjacent to the pixel region;
   a thin film transistor connected to the gate line and the data line in the pixel region;
   a first electrode disposed above the thin film transistor;
   a second electrode being partially disposed over the first electrode;
   a dielectric pattern on the second electrode, the dielectric pattern disposed within the second electrode; and
   a liquid crystal layer between the first and second substrates,
   wherein the second electrode comprises:
      a plurality of first bars spaced apart from each other and extending along a first direction parallel to the gate line;
      a first connecting part connecting the plurality of first bars and extending along a second direction parallel to the data line;
      a plurality of second bars symmetric to the plurality of first bars with respect to a central line of the pixel region, the plurality of second bars spaced apart from each other and extending along the first direction; and
      a second connecting part connecting the plurality of second bars and extending along the second direction, and
      wherein a gap distance between the plurality of first bars and the plurality of second bars is within a range of about 3% to 15% of a length of a side extending along the first direction of the pixel region.

2. The display device of claim 1, wherein the dielectric pattern includes an insulating material on the second electrode.

3. The display device of claim 2, wherein the insulating material of the dielectric pattern includes at least one of an inorganic insulating material and an organic insulating material.

4. The display device of claim 1, further comprising a black matrix on an inner surface of the second substrate, the black matrix partially corresponding to a location of the second electrode and partially corresponding to a location of a plurality of openings of the second electrode.

5. The display device of claim 4, wherein a first opening of the plurality of openings is formed between the plurality of first bars, a second opening of the plurality of openings is formed between the plurality of second bars, and a third opening of the plurality of openings is formed between the plurality of first bars and the plurality of second bars.

6. The display device of claim 5, wherein the black matrix comprises:

a first blocking part partially corresponding to a location of the first and second connecting parts;

a second blocking part partially corresponding to locations of at least one of the plurality of first bars and at least one of the plurality of second bars;

a third blocking part partially corresponding to locations of the first and second openings; and a fourth blocking part partially corresponding to a location of the third opening, wherein the first, second, third and fourth blocking parts are connected to each other to constitute a fourth opening exposing an edge portion of the plurality of first bars and an edge portion of the plurality of second bars.

7. The display device of claim 6, wherein the first blocking part partially corresponds to a location central to the first and second connecting parts;

the second blocking part partially corresponding to locations central of at least one of the plurality of first bars and at least one of the plurality of second bars;

the third blocking part partially corresponding to locations central of the first and second openings; and the fourth blocking part partially corresponding to a location central of the third opening.

8. The display device of claim 1, further comprising:

first and second capsule electrodes of a bar shape on an outer surface of the first substrate, the first and second capsule electrodes parallel to and spaced apart from each other;

a first liquid crystal capsule layer on the first and second capsule electrodes;

a first polarizing plate on the first liquid crystal capsule layer;

third and fourth capsule electrodes of a bar shape on an outer surface of the second substrate, the third and fourth capsule electrodes parallel to and spaced apart from each other;

a second liquid crystal capsule layer on the third and fourth capsule electrodes; and a second polarizing plate on the second liquid crystal capsule layer.

9. The display device of claim 8, wherein the first and second liquid crystal capsule layers operate as a quarter wave plate while a white image is displayed in the display device.

10. The display device of claim 8, wherein the first liquid crystal capsule layer includes a first binder and a plurality of first liquid crystal capsules dispersed in the first binder, wherein each of the plurality of first liquid crystal capsules includes a plurality of first liquid crystal molecules, wherein the second liquid crystal capsule layer includes a second binder and a plurality of second liquid crystal capsules dispersed in the second binder, and wherein each of the plurality of second liquid crystal capsules includes a plurality of second liquid crystal molecules.

11. The display device of claim 8, wherein the first polarizing plate has a transmission axis parallel to the first direction, wherein the first and second capsule electrodes are obliquely disposed to have a first oblique angle with respect to the first direction, wherein the third and fourth capsule electrodes are obliquely disposed to have a second oblique angle different from the first oblique angle with respect to the first direction, and wherein the second polarizing plate has a transmission axis parallel to the second direction.

12. The display device of claim 1, wherein the first electrode is either one of a common electrode and a pixel electrode, and the second electrode is the other one of the common electrode and the pixel electrode.

13. The display device of claim 1, wherein a plurality of liquid crystal molecules of the liquid crystal layer has a positive dielectric anisotropy ($\Delta\varepsilon<0$)when the liquid crystal layer is initially aligned along the first direction, and wherein the plurality of liquid crystal molecules of the liquid crystal layer has a negative dielectric anisotropy ($\Delta\varepsilon<0$) when the liquid crystal layer is initially aligned along the second direction.

14. A liquid crystal display device, comprising:

first and second substrates facing and spaced apart from each other, the first and second substrates having a pixel region;

a gate line and a data line on an inner surface of the first substrate, the gate line and the data line crossing each other adjacent to the pixel region;

a thin film transistor connected to the gate line and the data line in the pixel region;

a first electrode disposed above the thin film transistor;

a second electrode being partially disposed over the first electrode;

a dielectric pattern including an insulating material, the insulating material disposed on the second electrode; and a liquid crystal layer between the first and second substrates, wherein the second electrode comprises:

a plurality of first bars spaced apart from each other and extending along a first direction parallel to the gate line;

a first connecting part connecting the plurality of first bars and extending along a second direction parallel to the data line;

a plurality of second bars symmetric to the plurality of first bars with respect to a central line of the pixel region, the plurality of second bars spaced apart from each other and extending along the first direction; and a second connecting part connecting the plurality of second bars and extending along the second direction, wherein a gap distance between the plurality of first bars and the plurality of second bars is within a range of about 3% to 15% of a length of a side extending along the first direction of the pixel region, and wherein a shape of the insulating material of the dielectric pattern is a same as a shape of the second electrode.

15. The display device of claim 14, wherein a thickness of the insulating material of the dielectric pattern is a same as a thickness of the second electrode.

16. The display device of claim 14, wherein a width of the dielectric pattern is within a range of about 25% to 50% of a width of the second electrode.

* * * * *